(12) United States Patent
Tsunekawa

(10) Patent No.: US 7,990,557 B2
(45) Date of Patent: Aug. 2, 2011

(54) INFORMATION OUTPUT SYSTEM WITH TRANSFER TIMING CONTROL

(75) Inventor: Kiyohiro Tsunekawa, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1039 days.

(21) Appl. No.: 11/468,991

(22) Filed: Aug. 31, 2006

(65) Prior Publication Data

US 2007/0052998 A1 Mar. 8, 2007

(30) Foreign Application Priority Data

Sep. 2, 2005 (JP) ................................. 2005-255617

(51) Int. Cl.
*G06F 3/12* (2006.01)
(52) U.S. Cl. ..................... 358/1.15; 358/1.16; 358/1.13; 358/1.2; 382/284
(58) Field of Classification Search .................. 358/1.15, 358/1.1, 448, 450, 452, 537, 540, 1.17, 1.16, 358/1.2, 1.13; 707/527; 382/284
See application file for complete search history.

(56) References Cited

U.S. PATENT DOCUMENTS

2002/0046225 A1* 4/2002 Sugahara ...................... 707/527

FOREIGN PATENT DOCUMENTS

| JP | 05-028152 | 2/1993 |
| JP | 7-256935 | 10/1995 |
| JP | 10-058798 | 3/1998 |
| JP | 11-291561 | 10/1999 |
| JP | 2000-207146 | 7/2000 |
| JP | 2001-270169 | 10/2001 |
| JP | 2002-091721 | 3/2002 |

OTHER PUBLICATIONS

Suzuki M., Data processor has estimation unit which computes patterning estimation time of each page, based on capability information stored in memory, Jul. 28, 2000, Machine Translation of JP 2000207146.*
Japanese Office Action dated Nov. 13, 2009, in related corresponding Japanese Patent Appln. No. 2005-255617.

* cited by examiner

*Primary Examiner* — Benny Q Tieu
*Assistant Examiner* — Martin Mushambo
(74) *Attorney, Agent, or Firm* — Fitzpatrick, Cella, Harper & Scinto

(57) ABSTRACT

According to the present invention, an image forming apparatus comprises a print data generation unit which generates the print data; a reception unit which receives print data; an image data generation unit which generates image data of each page; an image forming unit which forms an image of each page on a medium; a calculation unit which calculates a generation time taken to generate image data; and a control unit which controls a timing when the image data is output to said image forming unit,
wherein said control unit controls a timing when image data of a page of interest is output to said image forming unit, on the basis of the generation time taken to generate the image data of the page of interest and the generation time taken to generate image data of n pages subsequent to the page of interest.

10 Claims, 19 Drawing Sheets

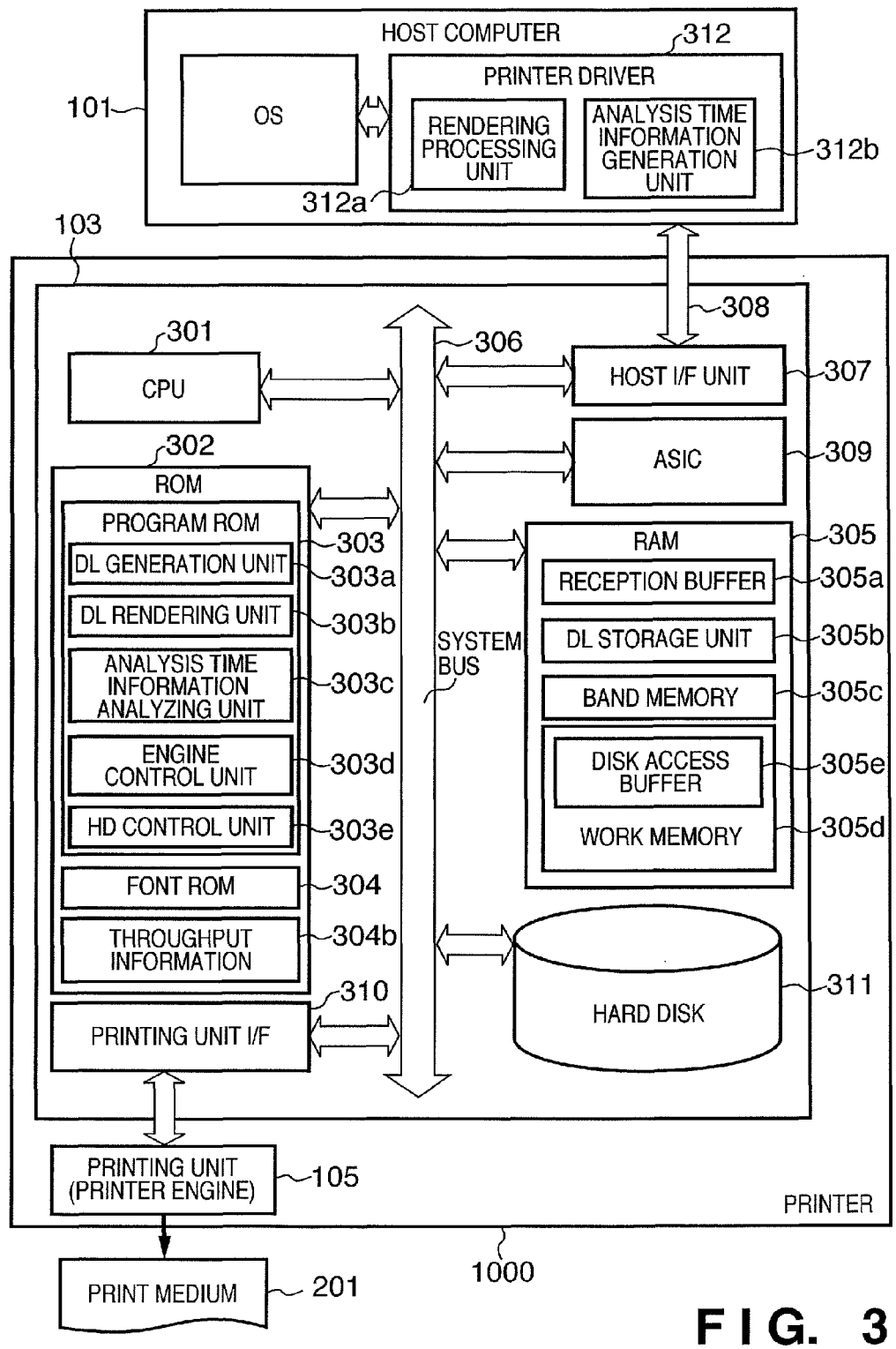
F I G. 3

INFORMATION OUTPUT SYSTEM WITH TRANSFER TIMING CONTROL

BACKGROUND OF THE INVENTION

1. Field of the Invention

The present invention relates to an image output system which prints based on print data described in a page description language.

2. Description of the Related Art

An image output apparatus (also called an image forming apparatus) such as a page printer which executes an image process in accordance with externally input print data performs a rendering instruction or device control on the basis of a page description language (to be referred to as a PDL hereinafter). The page description language is described in a predetermined format (syntax).

For example, there are various application software programs which run on an operating system (OS) such as MS-Windows® running on a personal computer and create various electronic documents. When the application software is to print, a printer driver running on the OS converts a rendering instruction output from the application software into PDL print data interpretable by an image output apparatus (printer). The printer driver outputs the print data to the image output apparatus via a predetermined interface. The printer driver and image output apparatus construct an image processing system. The printer driver converts a print request from application software into PDL print data of each page in accordance with a predetermined syntax.

A conventional page printer or the like analyzes received PDL print data in accordance with the PDL format, and generates an intermediate rendering object (to be referred to as a display list or simply a DL hereinafter). The page printer generates a bitmap image, i.e., page image representing the contents of each page on the basis of the intermediate rendering object. The conventional PDL contains various instructions for issuing a rendering instruction for each page. For example, the PDL includes a character print instruction, various graphic rendering instructions (e.g., line rendering instruction), an image rendering instruction, rendering logic (ROP designation such as AND or OR), an instruction to designate a clipping area, a macro instruction to group, store, and call a plurality of instructions, and an instruction group to set various print environments.

Every time generating a page image, the page printer outputs to the printer engine a /PRNT signal for designating the start of forming the page image. Subsequently to the /PRNT signal, the page printer transmits a video signal corresponding to the page image to the printer engine, and forms an image on a sheet surface by a known electrophotographic process, outputting the page image.

The image forming apparatus having this arrangement does not always complete analysis of a PDL instruction in received print data within a short time. If analysis of the PDL instruction takes a long time, the printer engine must wait until the page image is prepared. For example, paper feed starts before the end of an image analysis process for a given page when the end timing of the image analysis process is earlier than the start timing of sending the video signal of the page. If the end timing of the image analysis process is later than the start timing of sending the video signal, paper feed starts after the image analysis process ends (see Japanese Patent Laid-Open No. 7-256935). Alternatively, a host computer predicts and calculates in advance the image expansion process time when the engine can output print data of the start page, adds the calculated process time to print data, and transfers the print data (see Japanese Patent Laid-Open No. 2000-207146). The printer starts the engine after the delay of the added process time.

In the above-described prior arts, however, the PDL analysis process requires a long time in accordance with the degree of complexity of a rendering process designated by application software, and the printer engine cannot fully enhance its performance.

More specifically, if the printer engine receives PDL data having a heavy process load, the PDL data analysis time, i.e., DL generation time exceeds the upper limit which can maintain the throughput of the printer engine. The upper limit which can maintain the throughput of the printer engine is the formation time necessary to form, e.g., an image on one sheet medium. If the DL generation time exceeds this formation time, the printer engine suffers an idle time. In general, the printer engine temporarily stops upon generation of its idle time. In this case, the printer engine performs a post-rotation process. The post-rotation process is a process until the printer engine temporarily ends image formation and temporarily stops. Once the printer engine stops, it must execute a pre-rotation process to activate the printer engine so as to form an image again. The time taken for the post- and pre-rotation processes is the down time of the printer engine. For example, for a printer engine having a throughput of 30 ppm (pages/min), a page image of each page must be prepared within 2 sec in order to maintain the highest throughput. This is because a page image of a given page must be formed while printing a page immediately previous to the given page. If PDL analysis takes 2 sec or more, the printer engine temporarily stops. For this reason, the printer engine stops and restarts again and again while executing a print job of high-resolution printing in which pages with a heavy PDL process load continue.

According to Japanese Patent Laid-Open No. 7-256935, the feed timing is adjusted, but the down time of the printer engine cannot be prevented. According to Japanese Patent Laid-Open No. 2000-207146, the start timing of image formation can be delayed for only the start page. However, the down time of the printer engine between pages cannot be avoided.

SUMMARY OF THE INVENTION

The present invention has been made in consideration of the conventional situation, and has as its object to predict for each page the time taken to analyze print data and control the output timing of a page image on the basis of the prediction result. It is another object of the present invention to minimize the down time of an image forming unit generated by the print data analysis process and shorten the time until an output result is obtained.

In order to solve the above-described problems, the present invention has the following arrangement. That is, there is provided an image forming system having an image forming apparatus and a print data generation apparatus which generates print data of a format interpretable by the image forming apparatus and outputs the print data to the image forming apparatus, the print data generation apparatus comprising a print data generation unit which generates the print data, the image forming apparatus comprising:
　a reception unit which receives print data generated by the print data generation unit;
　an image data generation unit which generates image data of each page on the basis of the print data received by the reception unit;

an image forming unit which forms an image of each page on a medium on the basis of the image data generated by the image data generation unit;

a calculation unit which calculates a generation time taken to generate image data by the image data generation unit from the print data received by the reception unit; and a control unit which controls a timing when the image data generated by the image data generation unit is output to the image forming unit, wherein the control unit controls a timing when image data of a page of interest is output to the image forming unit, on the basis of the generation time taken to generate the image data of the page of interest and the generation time taken to generate image data of n pages subsequent to the page of interest.

According to the present invention, the time taken to analyze print data can be predicted for each page, and the output timing of a page image can be controlled on the basis of the prediction result. Consequently, the down time of the image forming unit caused by the print data analysis process can be minimized to shorten the time until an output result is obtained.

Further features of the present invention will become apparent from the following description of exemplary embodiments (with reference to the attached drawings).

BRIEF DESCRIPTION OF THE DRAWINGS

FIG. 3 is a block diagram for explaining the basic arrangement of the control unit (controller unit) of an image output apparatus, and the basic arrangement of the printer driver according to the embodiment;

DESCRIPTION OF THE EMBODIMENTS

First Embodiment

The first embodiment according to the present invention will be described below with reference to the accompanying drawings.

<Example of Configuration of Image Output System According to First Embodiment>

The configuration of an image output system according to the first embodiment to which the present invention is preferably applied will be described with reference to FIGS. 1 and 2.

Figure 1:
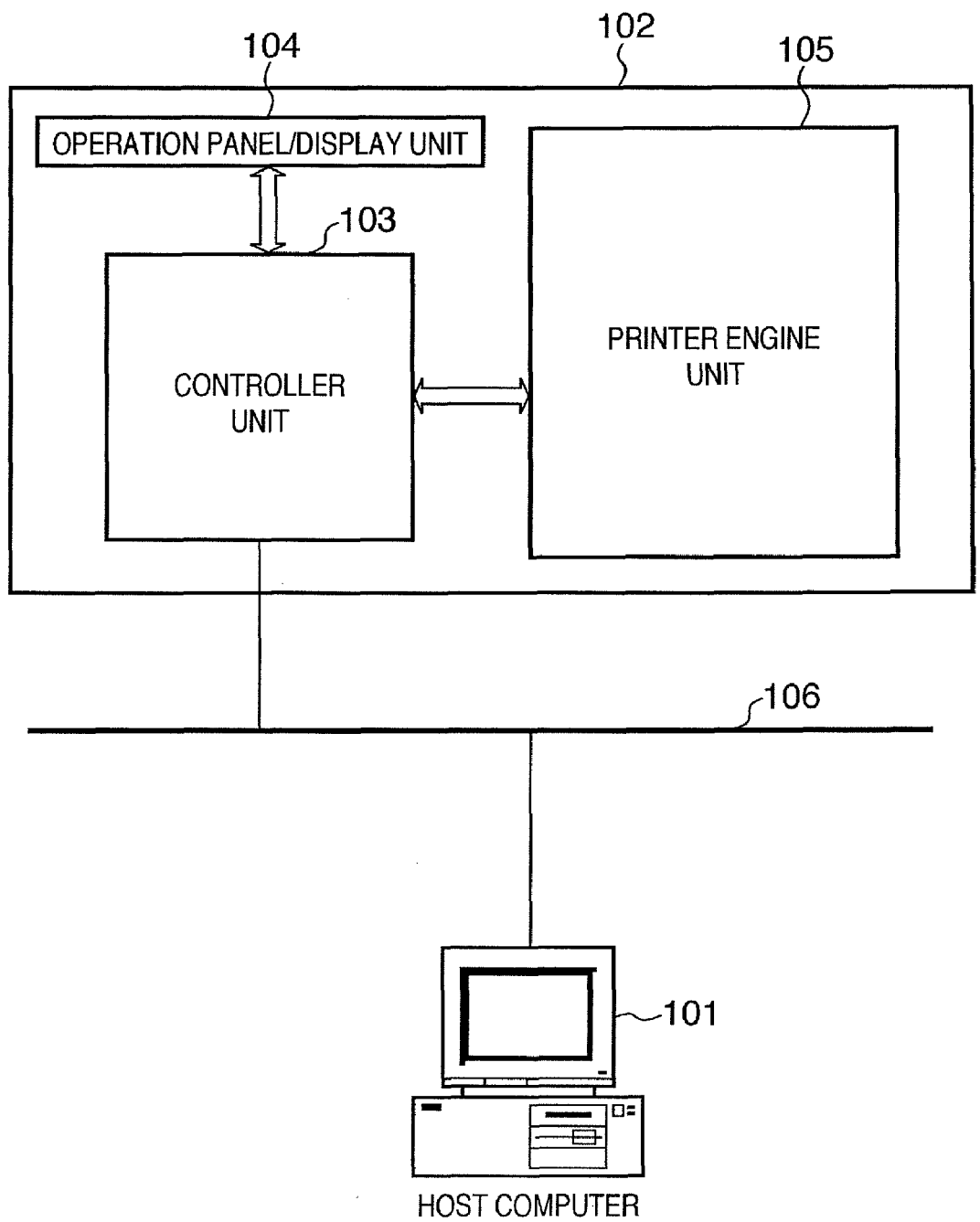
FIG. 1 is a block diagram for explaining the schematic arrangement of a laser beam printer to which the present invention can be applied, and that of a host computer in which a printer driver runs.

FIG. 1 is a block diagram schematically showing the image output system according to the first embodiment, and shows, for example, a laser beam printer. Note that an image output apparatus to which the present invention is applicable is not limited to the laser beam printer. The present invention is also applicable a printer apparatus of another printing type regardless of the difference in device arrangement between monochrome and color printers. Further, the present invention is not limited to the printer, and is also applicable to control of an image recording apparatus, image display apparatus, and image communication apparatus which require similar image output control.

In FIG. 1, an external device 101 is, e.g., a host computer, and a printer 102 is a laser beam printer main body in the first embodiment.

The laser beam printer 102 receives print data (e.g., a character code, graphic code, and image data) of a page description language (PDL) generated by a printer driver running on the external device 101. The laser beam printer 102 creates a character pattern and graphic pattern corresponding to the pieces of information, and forms an image on a print sheet serving as a print medium. The laser beam printer 102 can also register a character pattern, form data, macro data, and the like in a data storage unit (not shown). The laser beam printer 102 generates a page image corresponding to print data in the storage unit, similar to print data received from the host computer 101.

In the laser beam printer 102, a printer control unit (controller unit) 103 controls the whole laser beam printer 102, and analyzes print data supplied from the host computer 101. The control unit 103 is connected to a printer engine unit 105, generates page information from dot data based on the print data, and sequentially transmits the dot data (video signals) to the printer engine unit 105.

The printer engine unit 105 actually forms a latent image on the photosensitive drum in accordance with the dot data (video signals), and prints by thermally fixing the latent image on a sheet. An operation panel 104 has switches, an LED display, and the like for operation. The operator (user) can operate the operation panel 104 to instruct the laser beam printer 102 on a predetermined operation or to set the print environment or the like.

The laser beam printer 102 and host computer 101 connect to each other via a network 106 communicable with a predetermined protocol such as TCP/IP. A plurality of host computers generally connect to the network. The connection may be one-to-one connection via another interface such as a Centronics or USB interface.

Figure 2:
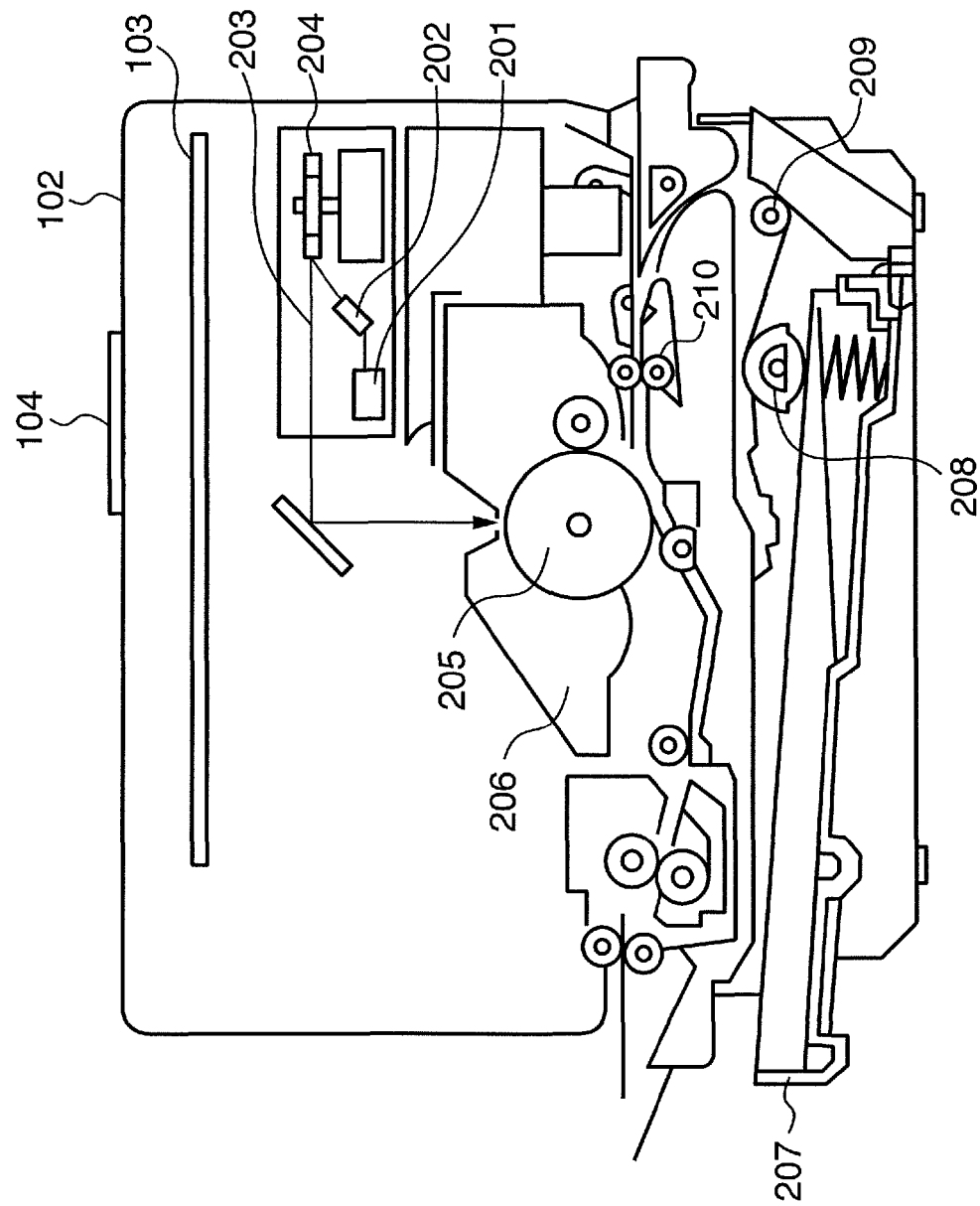
FIG. 2 is a sectional view showing the internal structure of the laser beam printer according to an embodiment.

FIG. 2 is a sectional view showing the internal structure of the laser beam printer 102 according to the first embodiment, and mainly shows the arrangement of the printer engine unit 105. In FIG. 2, the same reference numerals denote the same parts as those in FIG. 1, and a description thereof will be omitted.

In FIG. 2, a laser driver 201 is a circuit for driving a semiconductor laser 202, and switches the ON/OFF state of a laser beam 203 emitted from the semiconductor laser 202 in accordance with the video signal output from the control unit 103. A rotary polygon mirror 204 oscillates the laser beam 203 right and left to scan an electrostatic drum 205. The laser beam 203 forms an electrostatic latent image such as a character pattern with charged toner on the electrostatic drum 205. A developing unit 206 around the electrostatic drum 205 develops the latent image, and the developed image is transferred onto a print sheet. The print sheet is a cut sheet, and a sheet cassette 207 mounted in the laser beam printer 102 stores cut print sheets. A feed roller 208 and convey rollers 209 and 210 feed a cut sheet into the apparatus and supply it to the electrostatic drum 205.

FIG. 3 is a block diagram for explaining the basic configuration of the image output system according to the first embodiment. FIG. 3 shows the internal arrangement of the control unit 103 of the image output apparatus in FIG. 1 and the main arrangement of a printer driver 312.

In FIG. 3, the control unit 103 of the laser beam printer connects to the host computer 101 serving as an external device via a predetermined interface 308 (106). The control unit 103 executes a predetermined print process in accordance with print data sent from the printer driver 312 operating on the host computer 101. A reception buffer 305a temporarily stores print data received from the host computer 101 as reception data.

A printer CPU 301 comprehensively controls access to various devices connected to a system bus 306, and an ASIC 309 formed from a hardware circuit, on the basis of a control program stored in a program ROM 303 in a read-only ROM 302. The ROM 302 also serves as a memory (font ROM 304) for storing font data formed from a dot font for text output or a scalable font of the outline format.

The control program includes the following programs:

(1) a DL (Display List) generation unit 303a which analyzes print data stored in the reception buffer 305a and generates rendering objects (DLs) of at least one band or one page;

(2) a DL rendering unit 303b which generates a raster image (i.e., band image) of each band on the basis of the generated DL; and (3) an engine control unit 303d which outputs, to the printing unit (printer engine) 105 via a printing unit I/F 310, a video signal on the basis of the ON/OFF states of bits representing the band image, and controls various sheet handling control operations and the like such as detection of the absence of a sheet.

Note that output of image data is also called "ship". In the first embodiment, various function modules implemented by executing respective control programs by the printer CPU 301 will be referred to as the same names as those of corresponding programs. For example, the engine control unit 303d is a program name, and a function module implemented by executing this program is also called the engine control unit 303d.

According to a banding method of preparing a plurality of band images (for, e.g., two bands) and printing, generation (rendering operation) and output of a band image are performed in synchronism with sheet conveyance. In the banding process, while outputting rendered image data from one band memory, the engine control unit 303d renders a rendering object belonging to another band in the other band memory. The first embodiment configures a band memory 305c so as to print by banding. However, it is also possible to design the band memory 305c as a page memory capable of holding a page image of one page, and render and output an image by full painting. It is also possible to sequentially spool band images page by page in a hard disk 311 and output an image of each page (page spool). Further, banding, full painting, and page spool may be switched in accordance with an instruction from the panel or the like.

The laser beam printer 102 receives power from a power supply unit (not shown). In addition to the above structure, the control program stored in the program ROM 303 includes programs for implementing the following functions:

(4) an analysis time information analyzing unit 303c which reads analysis time information added to received print data every page, and predicts the time take to analyze the page;

(5) an HD control unit 303e which controls R/W access to the hard disk 311 for various data including a page image; and (6) a print environment control unit (not shown) which sets various print environments in accordance with an input from the operation panel 104.

The analysis time information represents the time for generating a page image, or contains base information for calculating the time. The analysis time information is sometimes called hint information or the like. Assume that the process time prediction equation is a linear equation whose parameter is the number of building elements (objects) of each type which form an image. In this case, the predicted time itself is the analysis time information, and the parameter (the number of building elements of each type which form an image) is the analysis time information.

The engine control unit 303d controls the output start timing on the basis of the analysis result of the analysis time information analyzing unit 303c.

A RAM 305 functions as a main memory, work memory, and the like for the CPU 301, and can expand its memory capacity by an operational RAM connected to an expansion port (not shown). The RAM 305 serves as a DL storage unit 305b which stores a rendered object generated by the DL generation unit 303a, and a work memory 305d temporarily used in various rendering processes performed by the control program stored in the program ROM 303. The RAM 305 also serves as a band memory 305c corresponding to an area of two (or more) planes among areas obtained by dividing one page into a plurality of bands. The RAM 305 further serves as a font cache memory (not shown) which caches a character pattern expanded on the basis of scalable data in the font memory 304.

The hard disk 311 registers resources such as font data and overlay data described in the PDL format, and is used for various print logs generated in the image output apparatus. In addition, the hard disk 311 temporarily stores print data and RIP page images in order to implement functions such as a save job, electronic sorting (printing of a plurality of copies), and confidential printing. Note that resource data, page images, and the like are stored in the hard disk 311 in the above description, but may be stored in a storage device of another arrangement such as a nonvolatile memory (e.g., flash memory: not shown). In the above description, an apparatus which builds the present invention receives a program stored in the ROM. However, the present invention is not limited to this, and the program may be supplied by another medium such as a hard disk, loaded into the RAM or the like before execution, and then executed. The present invention can also be practiced by installing and controlling the control program via a drive (not shown) from a storage medium such as a CD-ROM, CD-R, memory card, or DVD. The present invention includes this case.

The printer driver 312 runs on the host computer. The printer driver 312 includes a rendering processing unit 312a which spools each page, and an analysis time information generation unit 312b. The rendering processing unit 312a receives a print instruction from application software via the OS, and generates PDL print data interpretable by the image processing device 103. In accordance with the print data generation status, the analysis time information generation unit 312b generates analysis time information serving as a base to calculate the time taken to analyze print data. The contents and generation procedures of the analysis time information will be described later.

<Interface Signals (FIG. 18)>

Figure 18:
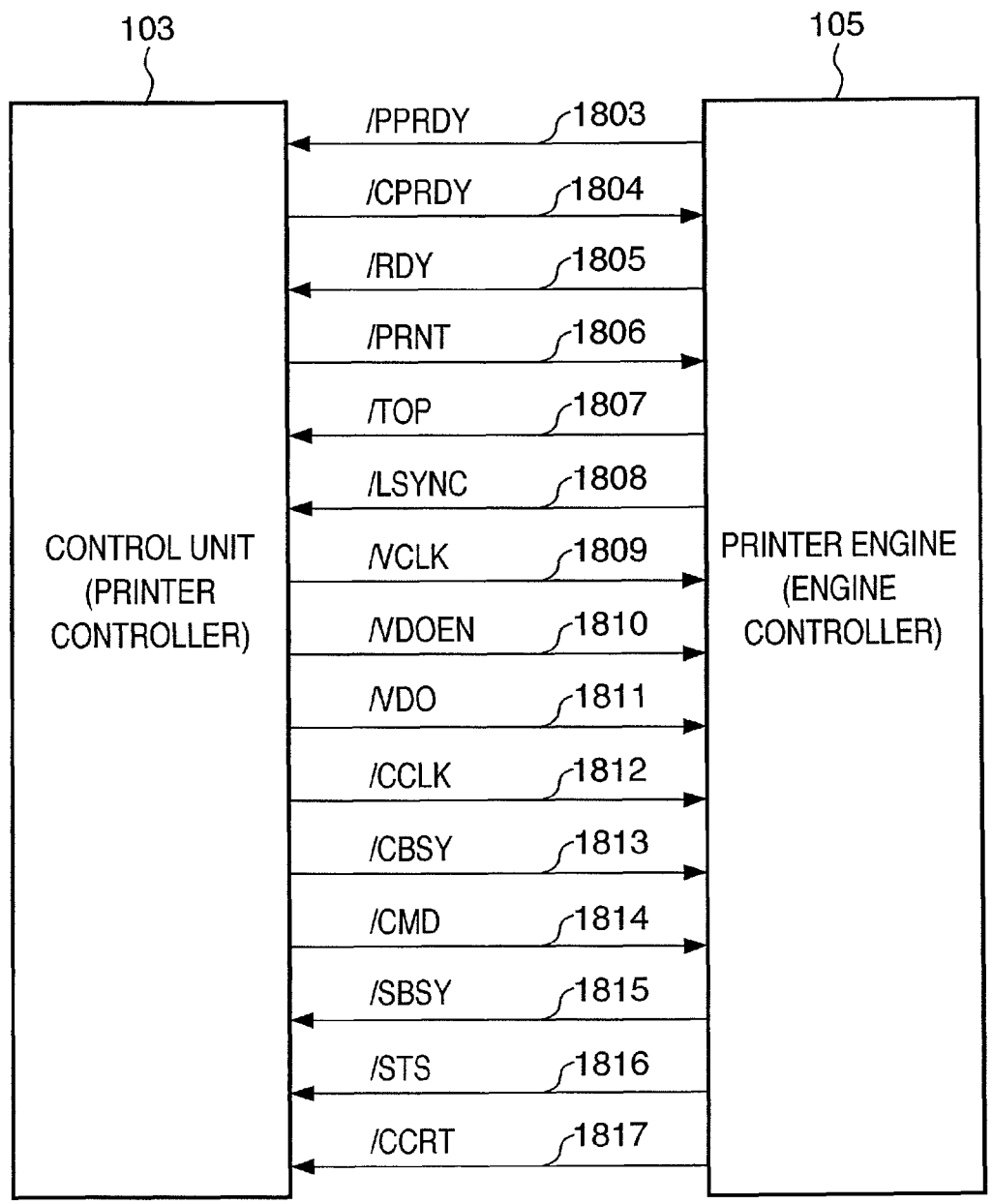
FIG. 18 is a chart showing an example of signals between a printer controller and the engine.

FIG. 18 shows an example of I/F signals between the control unit (also called the printer control) 103 and the printer engine 105. Only typical signals will be explained. The printer engine 105 contains an engine controller for controlling the printer engine. The engine controller exchanges signals with the printer controller 103. The interface shown in FIG. 18 transmits a video signal from the printer controller 103 to the printer engine 105, and will be referred to as a video I/F.

A /PPRDY signal 1803 represents that the printer engine 105 can communicate with the printer controller 103 after the printer receives power and a process for initial settings and the like ends. "/" of the signal name means that the signal has negative logic.

A /CPRDY signal 1804 represents that the printer controller 103 can communicate with the printer engine 105 after the printer controller 103 receives power and a process for initial settings and the like ends.

A /RDY signal 1805 represents that the printer engine 105 can print in accordance with a print start instruction (/PRNT signal to be described below) from the printer controller 103. The condition that this signal becomes true is that respective parts of the printer normally operate, such that the temperature in the fixing unit reaches a predetermined temperature, no print sheet remains in the printer, and the polygon mirror rotates at a predetermined speed.

A /PRNT signal 1806 instructs the printer engine 105 by the printer controller 103 to start or continue printing.

A /TOP signal 1807 is a sync signal which is transmitted from the printer engine 105 to the printer controller 103 and serves as a reference for vertical scanning of an image. The printer engine 105 outputs this signal a predetermined time after the printer controller 103 outputs the /PRNT signal 1806.

A /LSYNC signal 1808 is a sync signal serving as a reference for horizontal scanning by the printer controller 103. Similar to the /TOP signal, the printer engine 105 outputs the /LSYNC signal 1808 to the printer controller 103 a predetermined time after the printer controller 103 outputs the /PRNT signal 1806.

A /VCLK signal 1809 is a sync clock for /VDOEN and /VDO signals to be described below, and generates clocks of a frequency corresponding to an image signal from the printer controller 103.

A /VDOEN signal 1810 controls reception of an image signal output from the printer controller 103 into the printer engine 105. The printer engine 105 detects the value of this signal in synchronism with the /VCLK signal, and when the signal value is TRUE, receives the image signal, and when the signal value is FALSE, does not receive the image signal.

A /VDO signal 1811 is image data. The printer controller 103 outputs the /VDO signal 1811 in synchronism with the /VCLK signal by using, as a reference, the /TOP signal in the vertical direction and the /LSYNC signal in the horizontal direction.

A /CCLK signal 1812 is a sync clock when the printer controller 103 transmits a serial command to the printer engine 105 and the printer engine 105 sends back a serial status to the printer controller 103. The printer controller 103 outputs the /CCLK signal 1812.

A /CBSY signal 1813 shows to the printer engine 105 that the printer controller 103 transmits a serial command by using a /CMD signal 1814 to be described below.

The /CMD signal 1814 is used when the printer controller 103 transmits serial information to the printer engine 105. The serial information will be referred to as a command.

A /SBSY signal 1815 shows to the printer controller 103 that the printer engine 105 sends back a serial status by using a /STS signal.

A /STS signal 1816 is used when the printer engine 105 sends back serial information to the printer controller 103. The serial information will be referred to as a status.

A /CCRT signal 1817 notifies the printer controller 103 of a change of the internal status of the printer. Upon reception of this notification signal, the printer controller 103 uses the /CMD signal to issue a command to inquire which state on the engine side has changed. In response to this, the printer engine 105 notifies the printer controller 103 of the changed state by using the /STS signal.

<Print Control (FIG. 19)>

Figure 19:
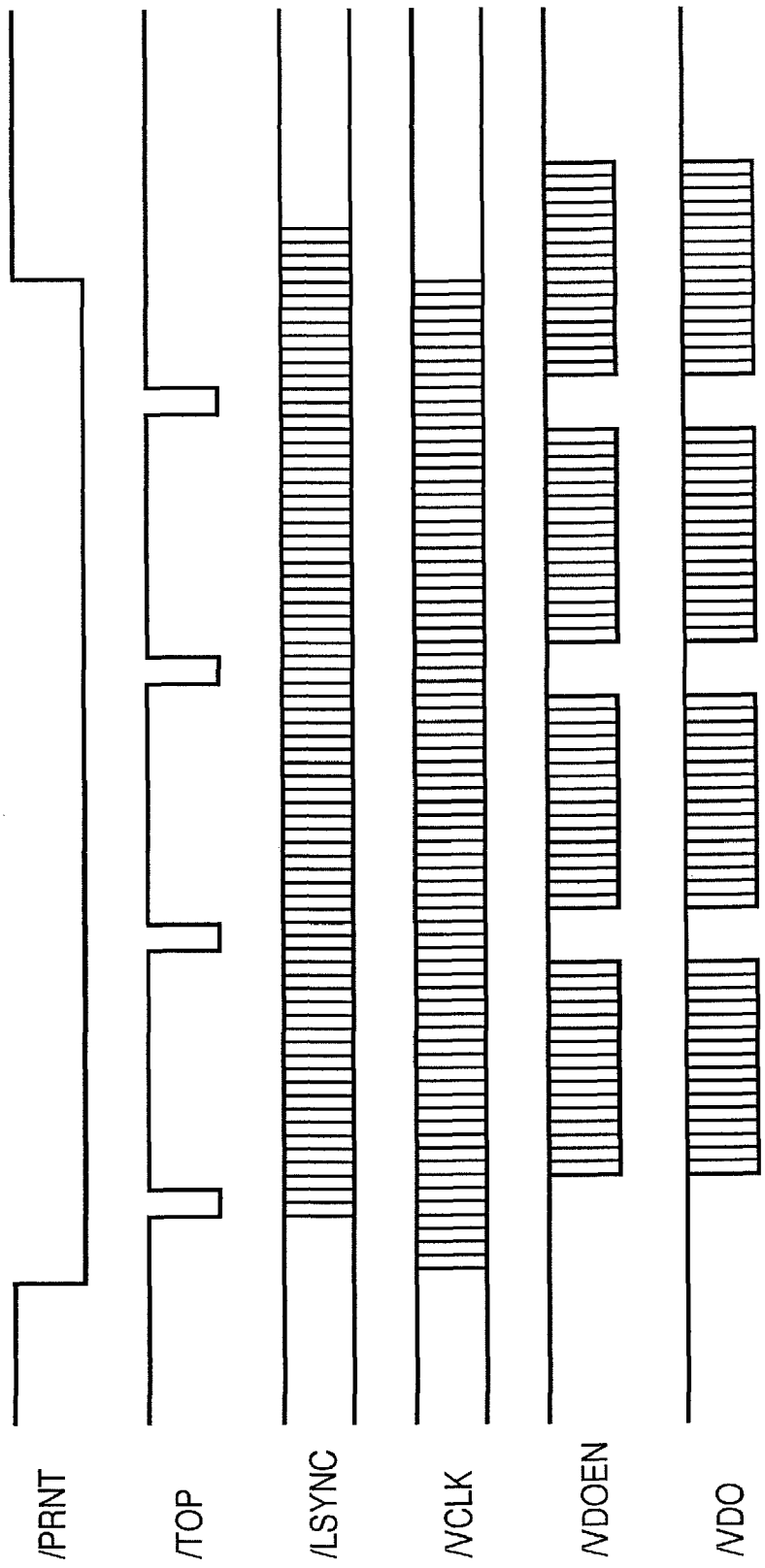
FIG. 19 is a timing chart showing an example of signals between the printer controller and the engine.

FIG. 19 shows the timings of signals exchanged between video I/Fs. FIG. 19 shows the description of the above-mentioned video I/F signals with the lapse of time.

When the printer controller 103 completes preparations for image information, it changes the /PRNT signal to low level (true), and notifies the printer engine 105 of it. At the same time, the printer controller 103 also generates the image sync signal /VCLK used to transfer an image signal.

In response to this, the printer engine 105 makes various settings and the like in the printer, and when it can receive an image, outputs the /TOP signal and /LSYNC signal to the printer controller 103. The printer controller 103 transfers the image signal /VDO and image enable signal /VDOEN to the printer engine 105 in synchronism with the vertical sync signal /TOP and horizontal sync signal /LSYNC. The printer engine PWM-modulates the received image signal /VDO. The printer engine modulates the semiconductor laser in accordance with the modulated PWM signal, and irradiates the photosensitive drum preliminarily charged by the modulated laser beam, forming a latent image. Simultaneously with this operation, the printer engine supplies and conveys a sheet medium at the timing when the top position of the formed latent image matches the leading position of the sheet medium.

In this manner, transmission of the /PRNT signal triggers a series of image formation processes such as transmission of a video signal from the printer controller 103 to the printer engine 105. In the following description of the first embodiment, processes after issuing of the /PRNT signal in the image forming apparatus may be omitted. Even in this case, however, the above-described image formation process is executed subsequently to issuing of the /PRNT signal.

<Example of Print Job Operation in Image Output System According to First Embodiment>
(Print Data Generation Procedures)

Figure 7:
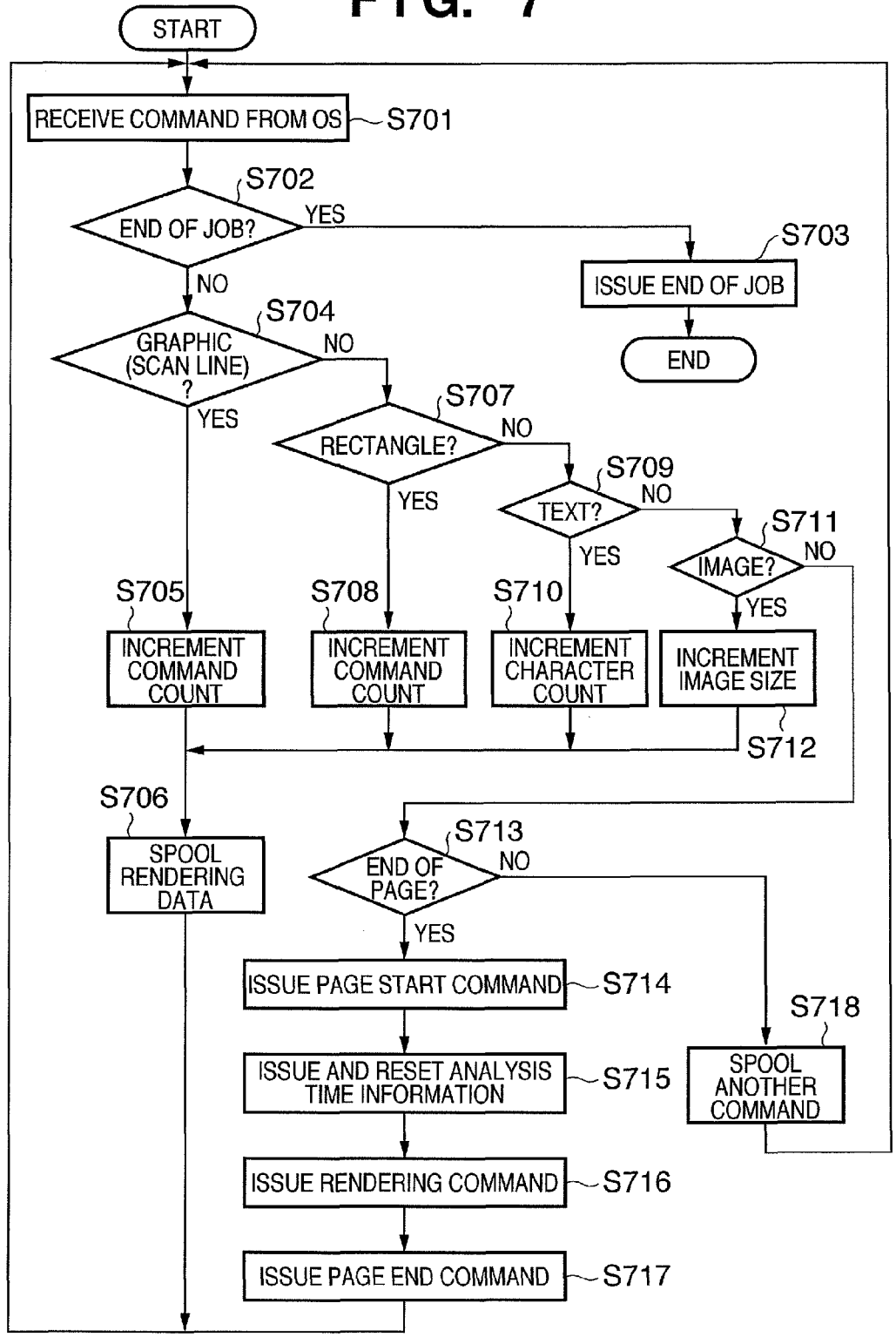
FIG. 7 is a flowchart showing procedures to generate print data by the printer driver in the first embodiment.

Procedures to generate print data by the printer driver 312 will be explained with reference to the flowchart of FIG. 7. In step S701 of FIG. 7, application software issues a rendering instruction to the printer driver via the OS (GDI). In the following steps, the printer driver generates PDL print data corresponding to the contents of the rendering instruction received from the OS.

In S702, the printer driver checks whether the rendering instruction received from the OS is to end the job. If the rendering instruction is to end the job, the printer driver issues a PDL job end instruction to the printer (S703), ending the print job. If the rendering instruction is not to end the job, the printer driver determines whether the instruction is a graphic (scan line) rendering instruction, rectangle rendering instruction, character print instruction, or image rendering instruction (S704, S707, S709, and S711). If the printer driver determines in step S704 that the instruction is a graphic (scan line) rendering instruction, it increments by one a counter representing the number of graphic (scan line) rendering instructions (S705). If the printer driver determines in step S707 that the instruction is a rectangle rendering instruction, it increments by one a counter representing the number of rectangle rendering instructions (S708). If the printer driver determines in step S709 that the instruction is a character print instruction, it increments by one a counter representing the number of character print instructions (S710). If the printer driver determines in step S711 that the instruction is an image rendering instruction, it adds an image size contained in the parameter to a counter representing the size of an image to be rendered by the rendering instruction (S712).

The printer driver converts each rendering instruction into the PDL format, and spools each page (S706). In order to process the next rendering instruction, the flow returns to step S701.

Figure 15:
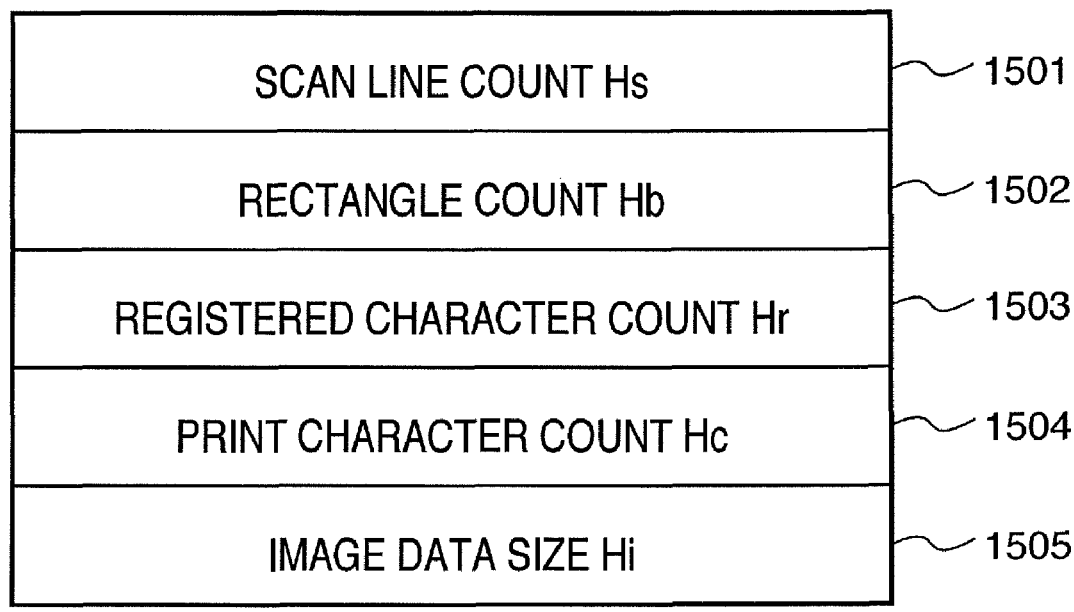
FIG. 15 is a view showing an example of analysis time information.

As shown in FIG. 15, the counter value of each instruction is a line count (Hs) 1501 of scan lines for the graphic, i.e., scan line rendering instruction, and a rectangle rendering count (Hb) 1502 for the rectangle rendering instruction. The counter value is a registered character count (Hr) 1503 and print character count (Hc) 1504 for the character print instruction. The counter value is the sum of image data sizes (Hi) 1505 of respective pages for image rendering. The counter incremented in step S710 includes two counters for the registered character count (Hr) 1503 and print character count (Hc) 1504. For a print instruction not accompanied with registration, the printer driver does not increment the registered character count (Hr).

The printer driver accumulates the instruction count or data size corresponding to each type of rendering instruction received from the OS, and obtains, as analysis time information for each page, the number of rendering instructions to be analyzed by the image output apparatus. The image output apparatus receives analysis time information of each page as print data (or together with print data). The image output apparatus divides the counter value of each instruction type contained in the analysis time information by the throughput per unit time calculated in advance for each instruction type. In this fashion, the image output apparatus calculates a prediction time necessary for PDL analysis of each page. Count values contained in analysis time information of a given page are Hs (scan line count), Hb (rectangle count), Hr (character count), Hc (character count), and Hi (KB). The throughput per unit time for analyzing each rendering instruction is determined by the controller performance of the image output apparatus including the CPU performance, and can be calculated in advance. In the first embodiment, a throughput information area 304b of the ROM 302 saves the throughput information. Assume that throughputs for scan line rendering, rectangle rendering, text registration, text printing, and image rendering are As (lines/sec), Ab (rectangles/sec), Ar (characters/sec), Ac (characters/sec), and Ai (KB/sec), respectively. In this case, a prediction value Tp of the process time taken to analyze the rendering instruction of this page can be calculated by $$Tp = Hs/As + Hb/Ab + Hr/Ar + Hc/Ac + Hi/Ai \text{ (sec)}$$

Referring back to FIG. 7, the subsequent process procedures of the printer driver will be explained. If the instruction is not even an image rendering instruction in step S711, the printer driver checks whether the instruction is a page end instruction (S713). If the instruction is a page end instruction, the printer driver outputs a PDL rendering instruction of one spooled page and the counter values (analysis time information) counted in steps S705, S708, S710 and S712 to the image output apparatus in steps from step S714. That is, the printer driver issues a page start command (S714), issues pieces of analysis time information, and resets these pieces of analysis time information in order to calculate the sum for a subsequent page (S715). The printer driver issues a rendering instruction of one spooled page (S716), and finally issues a page end command (S717).

If the printer driver determines in step S713 that the instruction is not even a page end instruction, the instruction is another one such as a command for tile registration, color designation, or the like, so the printer driver spools each page, similar to the scan line, rectangle, character, or image rendering instruction (S718). In the first embodiment, the printer driver calculates only pieces of analysis time information corresponding to the scan line, rectangle, text registration, text print, and image rendering instructions. In order to obtain a more accurate prediction value, the printer driver may also calculate the total number of rendering instructions for other commands.

As described above, the printer driver in the first embodiment obtains, for each page, base information (analysis time information) for calculating the time necessary for an analysis process for each rendering instruction type while spooling rendering data every page. The printer driver outputs the analysis time information together with rendering data as print data. Since rendering data is spooled every page, the printer driver need not spool the entire print job, preventing an input delay of print data to the image output apparatus.

<Example of Structure of Print Data>

Figure 6:
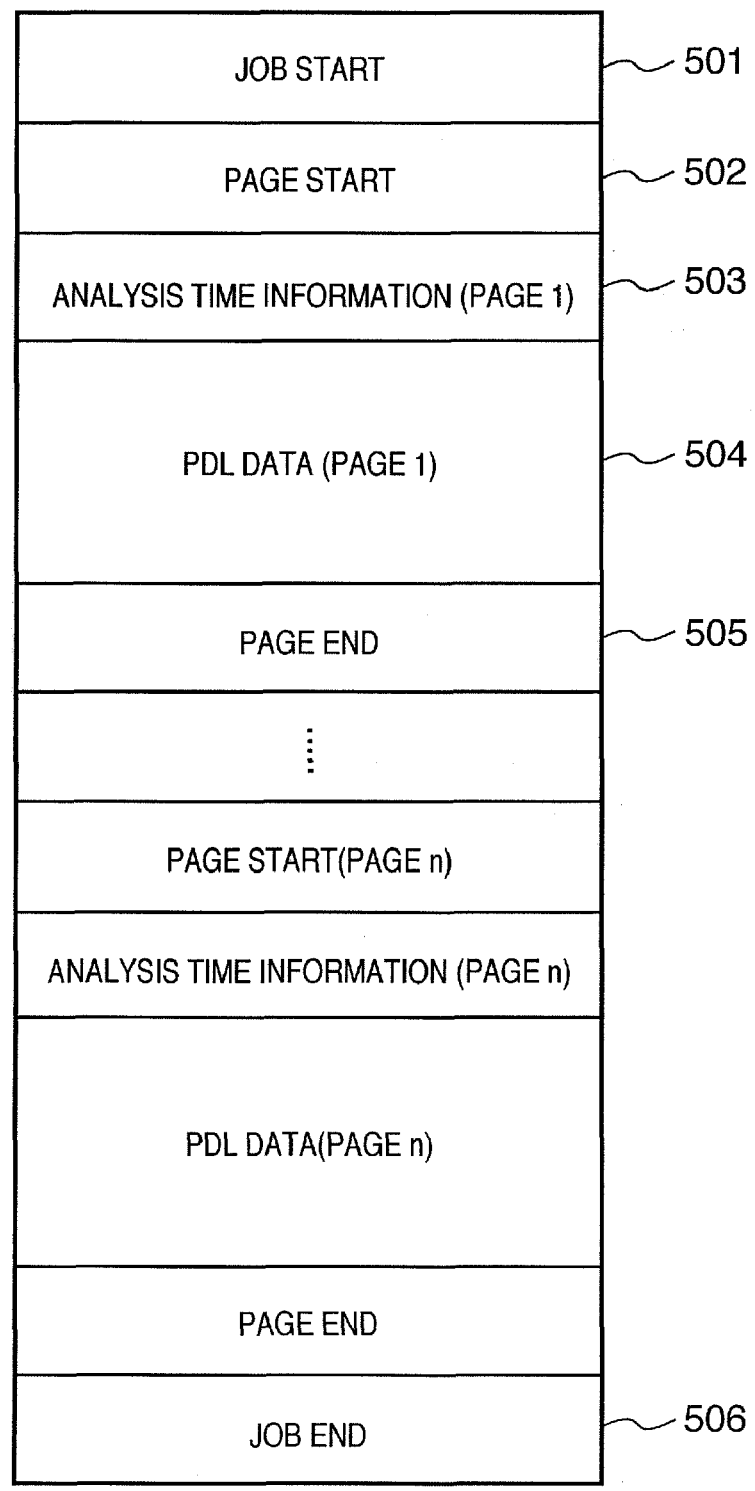
FIG. 6 is a view for explaining an example of the format of print data output from the printer driver to the image output apparatus according to the embodiment.

An example of the format of print data output to the image output apparatus from the printer driver which operates in accordance with the flowchart of FIG. 7 will be explained with reference to FIGS. 6 and 12. FIG. 6 shows the schematic structure of PDL data in print data. The PDL data is independent for each page. That is, the print data contains PDL data of respective pages between a job start instruction 501 and a job end instruction 506. The PDL data of each page is sandwiched between a page start instruction 502 and a page end instruction 505. Analysis time information 503 of the page follows the page start instruction. The PDL data of each page contains a rendering instruction such as the scan line rendering instruction, rectangle rendering instruction, text registration instruction, character print instruction, image rendering instruction, tile registration instruction, or color designation instruction.

Figure 12:
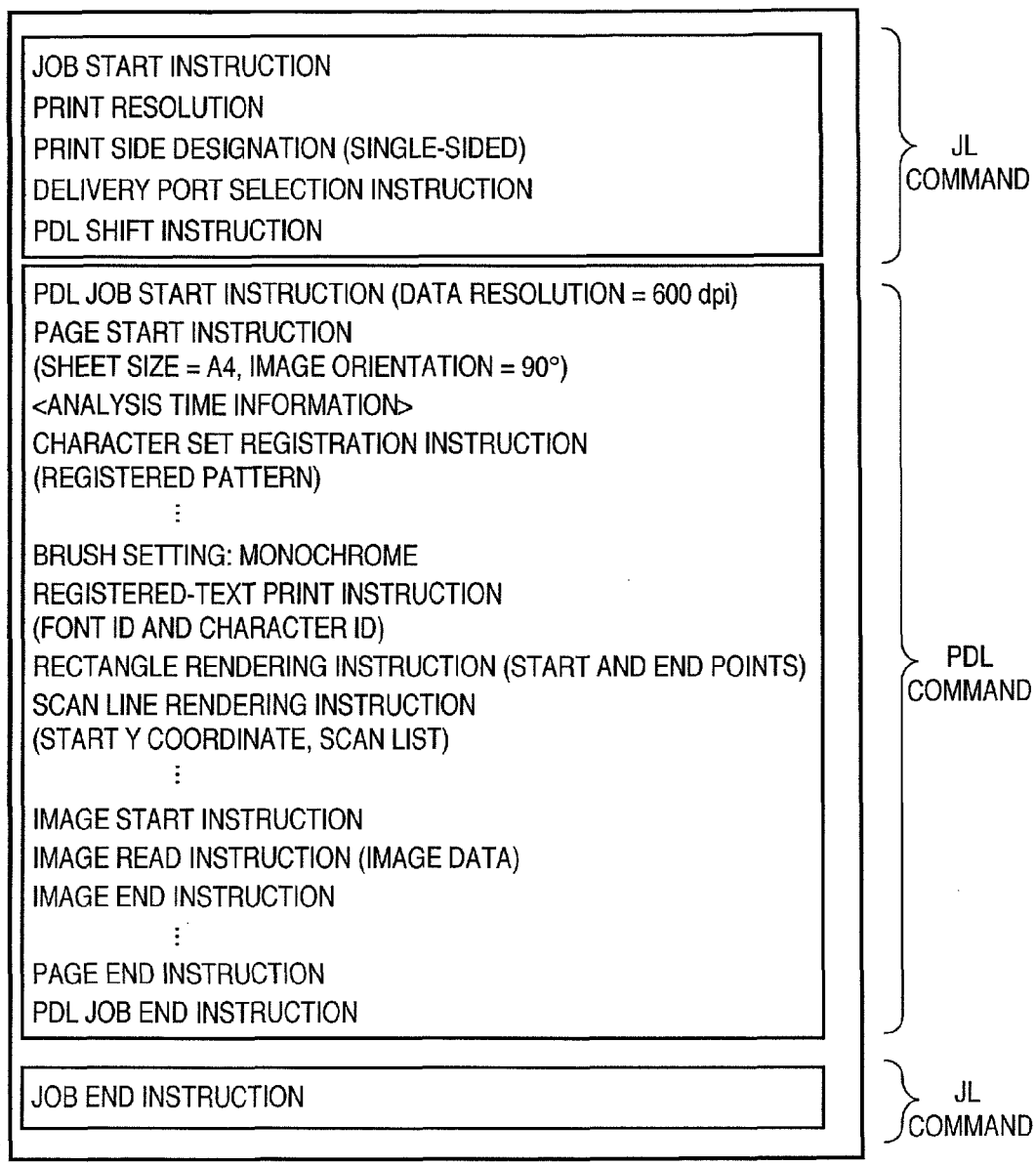
FIG. 12 is a view showing a concrete example of the overall structure of print data and a rendering instruction contained in the PDL field.

FIG. 12 shows a concrete example of the overall structure of print data and a rendering instruction contained in the PDL field. In FIG. 12, the JL (Job Language) describes the start and end of a print job, and the JL contains the following instructions which designate various environments (job environments) uniform in the print job.

a job start instruction representing the start of a print job (the parameter is job ID=JOBID.)
    a print resolution designation instruction to set a print resolution used to process a subsequent rendering instruction of the PDL data format (600 dpi in the first embodiment)
    a print side designation instruction which designates whether to print on one or two sides of a sheet (single-sided)
    a delivery port selection instruction (1=cassette 1)
    a PDL shift instruction which designates activation of a PDL analysis process program in order to process print data (LIPSLX is activated.)

Although not described in the first embodiment for descriptive convenience, the JL sometimes contains various instructions to remote-set various print environments settable from the operation panel, in addition to the above print environments. The contents set by the JL become effective within only the JL job by temporarily overwriting a print environment set on the operation panel.

The above instructions are JL commands (to be referred to as job environment setting instructions hereinafter), and subsequent instructions are described in the PDL.

a PDL job start instruction representing the start of PDL data (the parameter is the resolution=600 dpi at which rendering data is described.)
    a page start instruction (with parameters such as sheet size A4 and the image orientation=90°)
    analysis time information (see FIG. 15)

The following rendering instructions are described for each page.
    a character set registration instruction to register a character pattern designated by the OS (accompanied by various parameters and character pattern data)
    a brush designation instruction to determine a rendering color (R=0, G=0, and B=0)
    a registered-character print instruction to print a character pattern registered by a character set registration instruction (font ID and character ID)
    a rectangle rendering instruction (start and end points)
    a scan line rendering instruction
    an image start instruction and image end instruction In some cases, PDL data contains instructions of other types. Subsequent to the above instructions, various rendering instructions are designated for each page with the data structure as shown in FIG. 12.
    a page end instruction (delivery instruction)

For print data of a plurality of pages, PDL data from the page start instruction to the page end instruction are repetitively designated. The end of PDL data contains
    a PDL job end instruction After the PDL data, the JL describes the end of the print job again. That is, the JL contains
    a job end instruction which defines the end of the print job by the JL.

<Control Example by Printer Engine>

Figure 11:
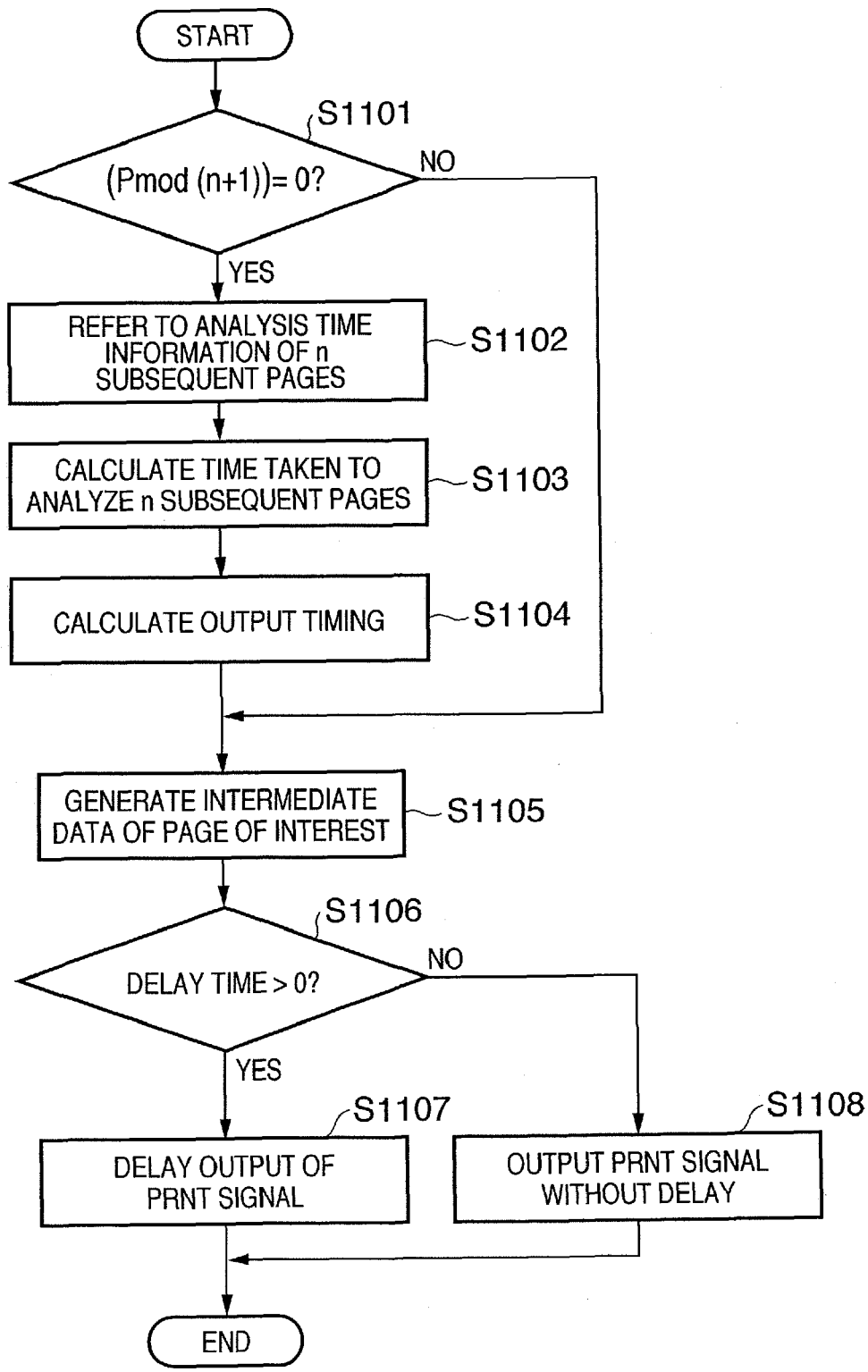
FIG. 11 is a flowchart for explaining the control procedures of a printer engine (image forming unit) in the image output apparatus according to the embodiment.

The control procedures of the printer engine (image forming unit) in the image output apparatus according to the first embodiment will be explained with reference to FIGS. 4 and 5 and the flowchart of FIG. 11. Process procedures performed by the image output apparatus by referring to analysis time information will be described with reference to the flowchart of FIG. 11. The process in FIG. 11 is executed every page in order to generate image data of each page, i.e., a page image. In FIG. 3, the analysis time information analyzing unit 303c executes steps S1101 to S1104, the engine control unit 303d executes steps S1106 to S1108, and the DL generation unit 303a executes step S1105. Simultaneously with the process in FIG. 11, a page image is output and an image is formed. In FIG. 11, the process time of n subsequent pages is predicted (S1101 to S1103) before generating a page image (S1104). However, the order may be reversed to predict the process time of n subsequent pages (S1101 to S1103) after generating a page image (S1104).

In step S1101, the analysis time information analyzing unit 303c determines whether the remainder of dividing the page number p of a page of interest by (n+1) is 0. The page number means the order of pages when the start page in a print job is defined as the 0th page and one side of a sheet subjected to image formation is counted as one page. Steps S1102 to S1104 are executed every n pages. The value n indicates the number of pages referred to in order to control the output timing of a page of interest in consideration of the predicted processing time of n subsequent pages. For example, when n is 1 and the page number of interest is an even number, the analysis time information analyzing unit 303c determines YES in step S1101. If n is 2 and the page number of interest is a multiple of 3, the analysis time information analyzing unit 303c determines YES in step S1101.

If the analysis time information analyzing unit 303c determines YES in step S1101, it reads out pieces of analysis time information of n pages subsequent to the page of interest by referring to unprocessed print data stored in the reception buffer 305a in step S1102. That is, the analysis time information analyzing unit 303c reads pieces of analysis time information of the (p+1)th page to (p+n)th page. In the first embodiment, the number n of pages whose analysis time information is referred to is set to 1. That is, the analysis time information analyzing unit 303c refers to only analysis time information of a page p+n immediately subsequent to the page of interest. In step S1103, the analysis time information analyzing unit 303c calculates the total time (predicted processing time) necessary to PDL-analyze n subsequent pages, from the analysis time information and the throughput of the image output apparatus, as described above. Note that Tp(i) represents the predicted processing time of a page i. STp(p,n) represents the total predicted processing time of n pages starting from the page p+1. That is, $STp(p,n) = \Sigma Tp(i)$ ($i=p+1, \ldots, p+n$). The predicted processing time is calculated every page, and the calculated predicted processing times of n pages are summed to obtain STp(p,n).

In step S1104, the analysis time information analyzing unit 303c calculates, from the predicted processing time STp(p,n) and the page output interval (to be also referred to as a throughput maintenance interval hereinafter) of the printer engine, the timing when an output instruction to the printer engine starts. The throughput maintenance interval has a constant value (Te) depending on, e.g., the size in one image forming apparatus. The throughput maintenance interval of n pages is n×Te, which is represented by STe(n). The analysis time information analyzing unit 303c calculates a delay time by calculating STp(p,n)−STe(n) (S1104). The calculated delay time is saved in the RAM or the like.

In step S1105, the DL generation unit 303a generates intermediate data (DL) by analyzing PDL data of a page (page of interest) whose page image is to be generated. Note that p represents the page number of the page of interest.

In step S1106, the engine control unit 303d determines whether the delay time (STp(p,n)−STe(n)) calculated in step S1103 is larger than 0. If the delay time (STp(p,n)−STe(n)) is larger than 0, the engine control unit 303d delays the output start timing of the page of interest by the delay time (STp(p,n)−STe(n)) (S1107). The engine control unit 303d delays the output in step S1107 as follows. The output start timing is represented by the value of a delay timing area (delay timing value) set in the RAM 305 or the like. The output timing when output of the page image starts without any delay immediately after the completion of generating the page image is set to a delay timing value of 0. That is, the delay timing is set from a base point which is the timing when generation of the page image is complete. The engine control unit 303d adds the delay time obtained in step S1105 to the delay timing value. The delay timing value set from a base point which is the timing when generation of the page image is complete can be quantitatively stored. In step S1107, the engine control unit 303d sets, e.g., the delay timing value of the page of interest in the timer, and starts the timer. When the timer completes counting, the engine control unit 303d issues the /PRNT signal for the page of interest, and starts outputting the page image of the page of interest. By delaying the output timing of the page of interest, the start of outputting a subsequent page follows the completion of outputting a preceding page (image formation). A page image can be output while maintaining the throughput.

If the engine control unit 303d determines in step S1106 that the delay time is equal to or smaller than 0, the flow branches to step S1108. If the delay time (STp(p,n)−STe(n)) is equal to or smaller than 0, a page image can be output before the completion of forming the image of the page of interest, while maintaining the throughput of subsequent pages. Thus, the engine control unit 303d outputs the /PRNT signal without delaying the start of output (S1108). After issuing the /PRNT signal, the image output apparatus outputs an image signal to the printer engine, as described with reference to FIG. 19.

If the analysis time information analyzing unit 303c determines NO in step S1101, it neither predicts nor calculates the process time of n subsequent pages. The flow branches to step S1105. The delay time calculated in step S1104 is reset before executing the process in FIG. 11 for each page. When the flow branches from step S1101 to step S1105, the engine control unit 303d always determines NO in step S1106, and the flow branches to step S1108.

The throughput maintenance interval Te is the time interval at which a sheet is delivered while the printer engine maintains the highest throughput. For example, for a 30-ppm printer engine, the throughput maintenance interval Te per page is 60/30=2 sec. The procedures in FIG. 11 are executed every page.

By these procedures, the image output apparatus predicts and calculates the time taken to analyze PDL data of n subsequent pages. The image output apparatus obtains the delay time of shipping from the prediction result. By delaying shipping every n pages by the obtained delay time, the image output apparatus can shorten the down time caused between image formation operations of n subsequent pages. If the timing when shipping starts delays, the timing when supplying a sheet (sheet medium) to, e.g., the feed tray also delays in accordance with the delayed shipping start timing.

When shipping is performed by banding, the image output apparatus parallel-executes a process to generate image data of each band on the basis of intermediate data of each band and a process to ship the generated image data of each band. Shipping further delays by the time taken to generate the image of the start band, but the pre-rotation process time of the engine can absorb this delay. If the pre-rotation process cannot absorb the delay, the time taken to generate the image of the start band may be added to the analysis time STp(p,n) calculated in step S1104 of FIG. 11. An image generation process for the second and subsequent bands is executed parallel to image formation, and need not be considered in the present invention. Assume that so-called data underrun does not occur in which image generation for each band does not catch up with image formation.

Note that the operation panel of the printer allows the user to designate the number n of pages. The host computer can also notify the printer of the value n designated in the host computer by setting the value n in the JL or the like or in a unique command. The value n can also be determined in advance, and the printer can use the fixed n value. The n value is 1 in this example, but may be 2 or more.

<Concrete Example of Output Timing>

Figure 4:
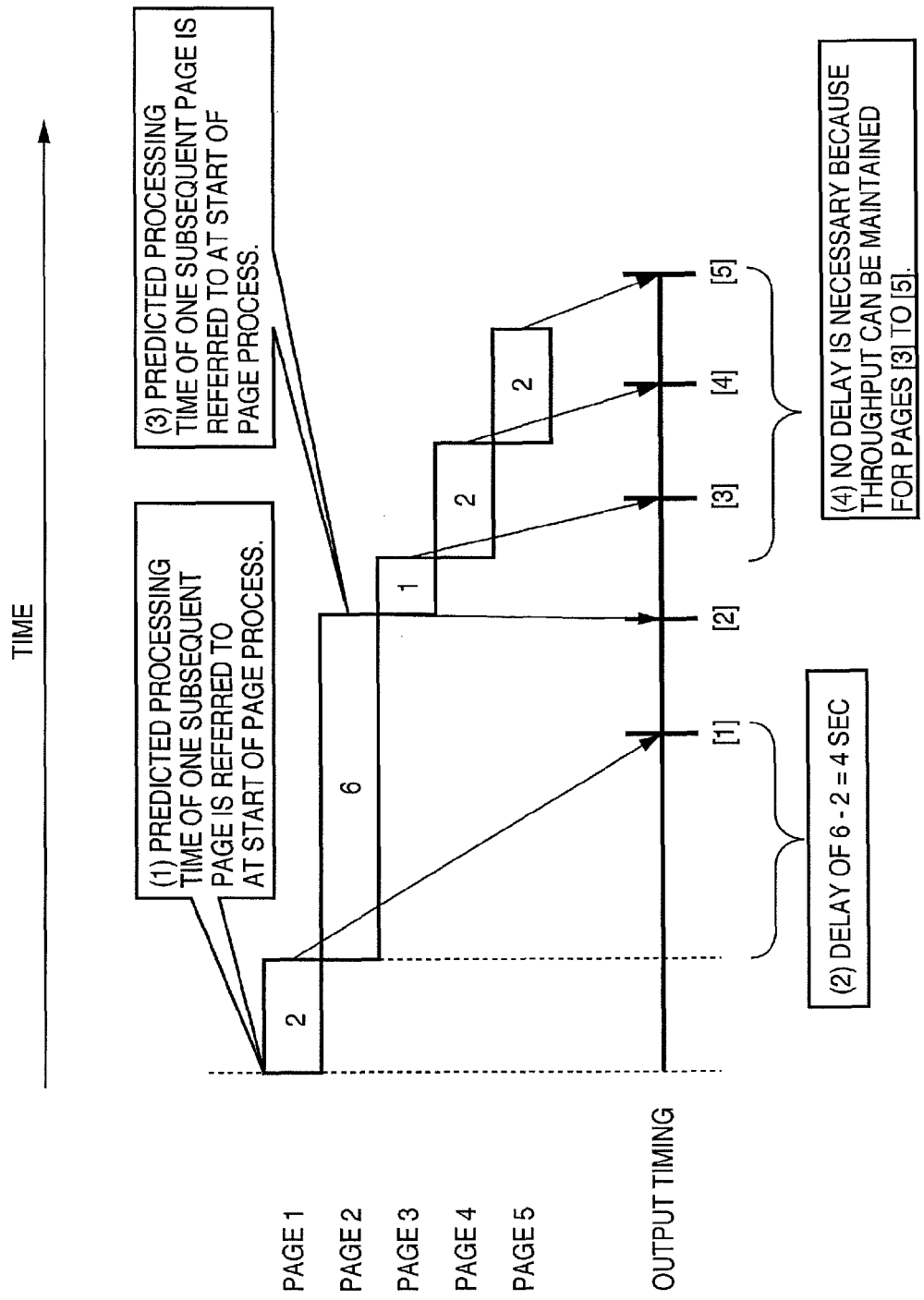
FIG. 4 is a timing chart showing a control example of engine activation and the output start timing of each page in the first embodiment.

FIG. 4 shows a control example of the output timing when n=1 in the first embodiment. FIG. 4 shows a state of processing a 5-page print job. The analysis times Tp of respective pages are calculated into 2, 6, 1, 2, and 2 sec. In the prior art, output of a page of interest (first page) starts after the end of analyzing it. In the first embodiment, the analysis time Tp (2) calculated from analysis time information of a page (second page) subsequent to the page of interest (first page) is 6 sec. Hence, the start of outputting the page of interest delays by STp(1,1)−STe(1)=6−2=4 sec. With this delay, the analysis process of the page (second page) subsequent to the page of interest just ends the throughput maintenance interval STe after the start of analyzing the subsequent page. Output of the subsequent page can start without any delay, and the output can continue without down time of the printer engine between the first and second pages. Similarly, for the third and subsequent pages, STp−STe is calculated for each page by referring to pieces of analysis time information of subsequent pages. If STp−STe>0, the output start timing is delayed by STp STe. In the example of FIG. 4, the throughput can be maintained for all the subsequent pages, and the print operation continues without delaying the output start timing.

Figure 5:
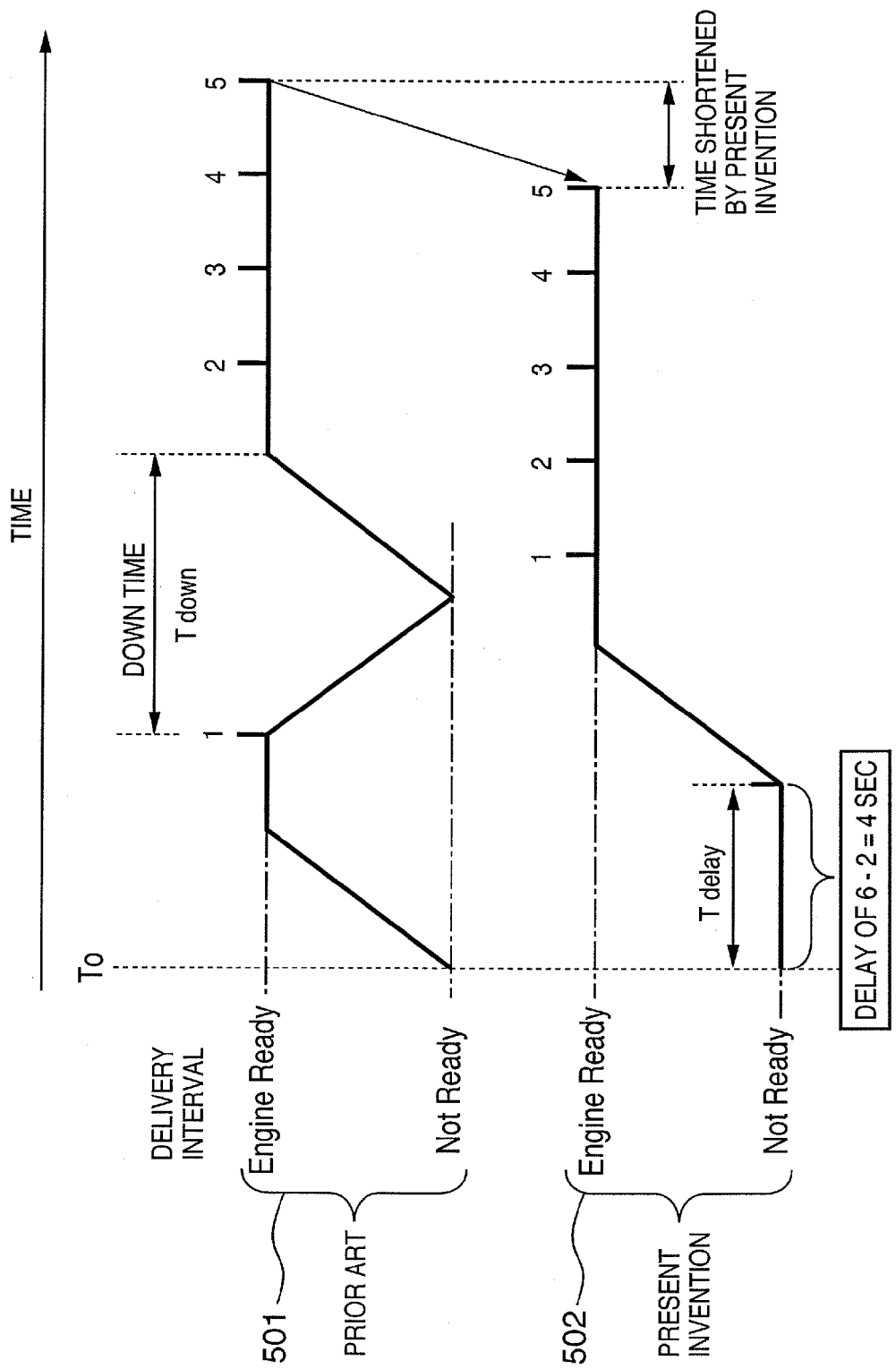
FIG. 5 is a timing chart showing an example of the engine state and the delivery interval by a conventional control method and an example of the engine state and the delivery interval by an engine control method according to the first embodiment.

FIG. 5 is a timing chart showing an example of a change in the delivery interval between pages under the control shown in FIG. 4 in comparison with the prior art. Polygonal lines 501 and 502 in FIG. 5 represent printer engine states, respectively. A hatched line from the "Not Ready" state to the "Engine Ready" state exhibits a pre-rotation process, and a hatched line from the "Engine Ready" state to the "Not Ready" state exhibits a post-rotation process. In FIG. 5, the polygonal line is drawn using the analysis end timing (timing when output starts in the prior art) to of the first page as a base point. The state transition 502 shows that the first page is output STp(1,1)−STe(1)=6−2=4 sec after the completion of analyzing the first page. That is, actual output delays by 4 sec after output becomes possible. This setting makes it possible to output the second and subsequent pages while maintaining the throughput. Data can be output at high speed in the absence of the down time between post-rotation of the printer engine and the ready state. To the contrary, the state transition 501 in the prior art shows that the printer engine executes post- and pre-rotation processes between the first and second pages, causing the down time. The down time Tdown is longer than the delay time Tdelay in the state transition 502 according to the present invention. Thus, the printing system according to the first embodiment can prevent any down time during printing and increase the process efficiency.

<Example of Structures of Rendering Object and Rendering Information>

Figure 8:
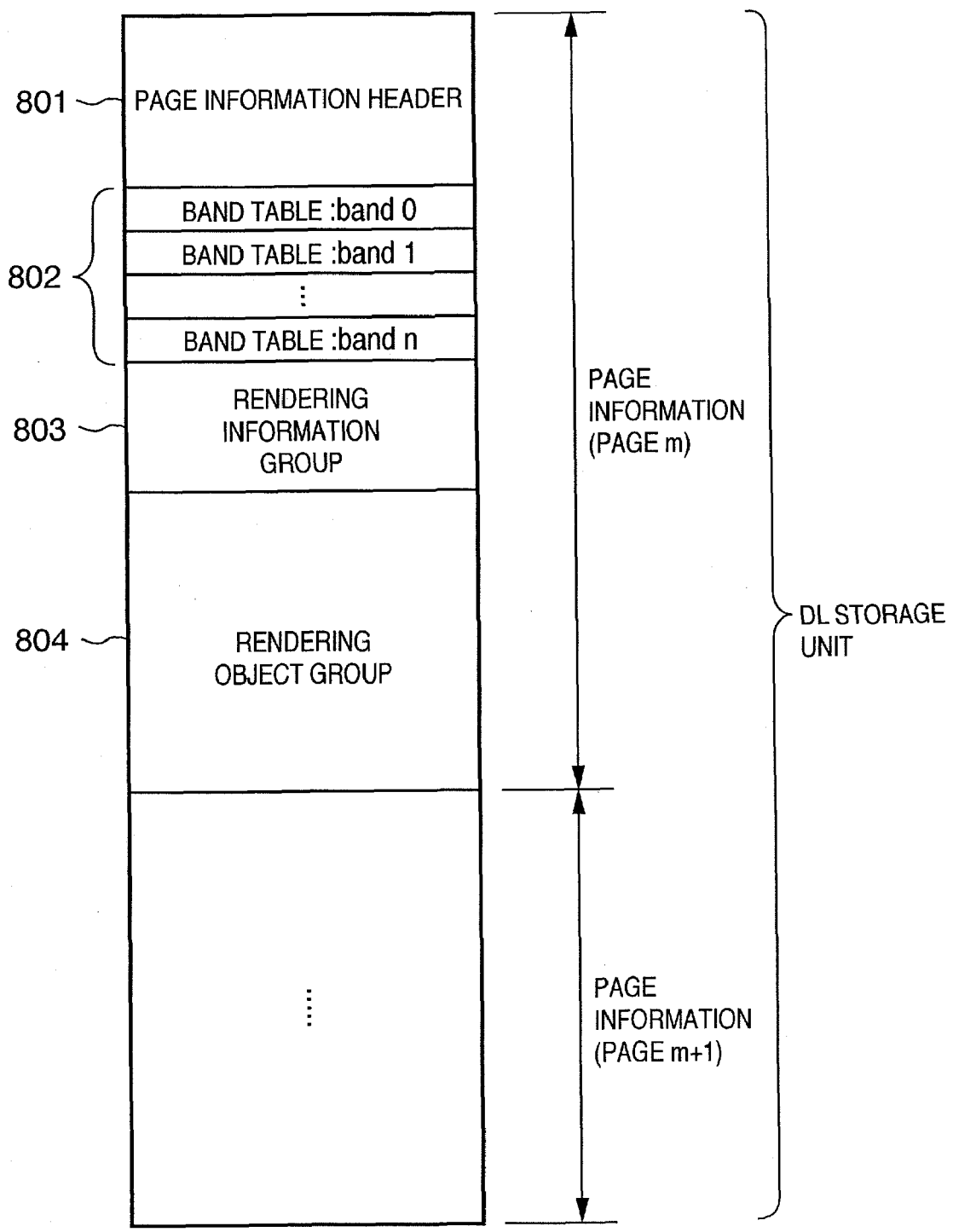
FIG. 8 is a view showing a memory map representing the contents of one page in a DL storage unit 305*b*.
Figure 9:
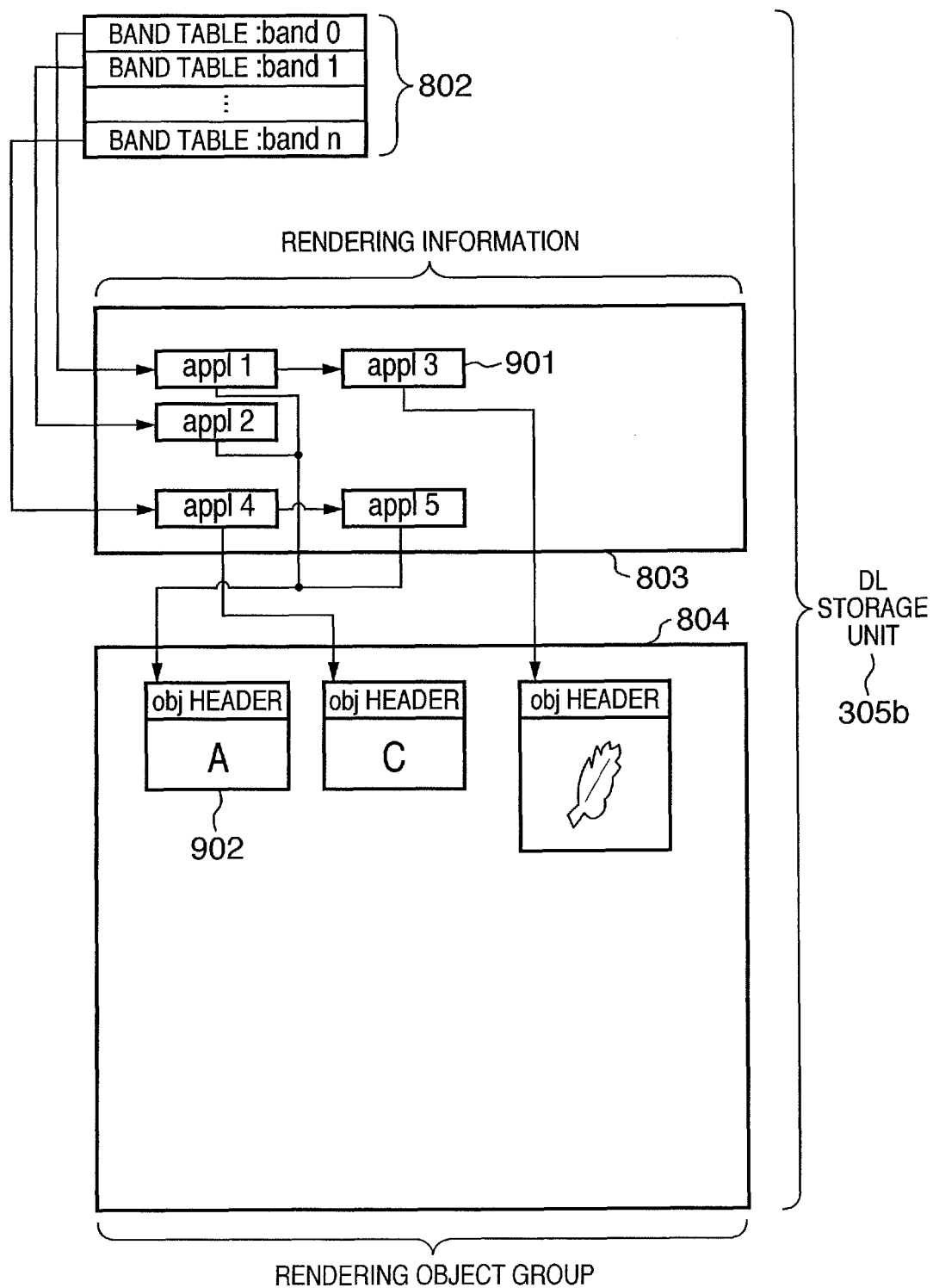
FIG. 9 is a block diagram showing schematic linking between rendering information and a rendering object.
Figure 10:
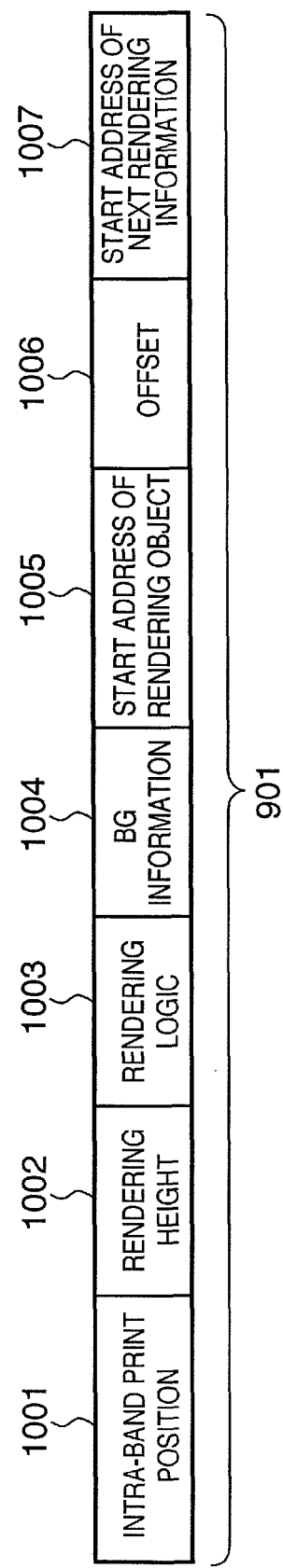
FIG. 10 is a view showing the structure of the rendering information.

The structure of a rendering object and rendering information generated by the image output apparatus in the first embodiment will be described with reference to FIGS. 8, 9, and 10. FIG. 8 is a view showing the memory map of the DL storage unit 305b for one page in the first embodiment. FIG. 9 is a block diagram showing linking between a rendering object and rendering information. FIG. 10 is a view schematically showing an example of the structure of the rendering information.

In FIG. 8, a page information header 801 stores various rendering parameters of each page. The page information header 801 has pieces of information managed for each page, such as the print resolution of the page, the sheet size, the color mode, the number of bands, the total capacity (memory capacity used) of rendering objects belonging to the page, the page state (e.g., rendered/during output), and the page number which is counted sequentially after power-on and used to identify the page. For example, the print resolution is determined from a print resolution designated by the JL at the start of a job. The number of bands is obtained from the sheet size and print resolution by setting the height of each band to a fixed value.

A band table 802 has areas by the number of bands. The band table 802 links to a rendering information group 803 belonging to one band. FIG. 9 shows an example of the band table 802 and rendering information group 803. The rendering information group 803 includes a rendering information unit 901. As will be described later, each rendering information unit holds information representing where and how each rendering object 902 is to be printed in each band. The DL storage unit 305b contains a rendering object group 804 which stores a DL generated from a character pattern, image data, and graphic data (e.g., rectangles and scan lines) to be printed. The rendering information unit is called "appl" (abbreviation) in FIG. 9. In the first embodiment, the rendering information units 901 and rendering objects 902 are separately held in the rendering information group 803 and rendering object group 804 in the DL storage unit 305b, respectively. Alternatively, the rendering information units 901 and rendering objects 902 may be held together.

FIG. 10 is a schematic view showing the structure of one rendering information unit. The rendering information unit contains the following pieces of information for rendering a rendering object. More specifically, one rendering information unit contains a print position (bit offset value from the upper left of the band) 1001 in the band, a rendering height 1002 of a rendering object, rendering logic (e.g., AND/OR) 1003 with a band raster, background information (BG information) 1004 representing information to be rendered on the background of the rendering object, a start address 1005 of an associated rendering object, an offset (line count) 1006 representing an amount by which the rendering object is skipped in rendering middle and subsequent parts of the rendering object from the start of the band, and a start address (NULL at the end of the link) 1007 of the next rendering information. The BG information is formed from gray level, and a dither pattern corresponding to the gray level is pasted as the background of each rendering object in rendering.

In rendering a rendering object over a plurality of bands, a plurality of rendering information units are associated with one rendering object. In printing the same character by a font object, a plurality of rendering information units correspond to one font object. In other words, rendering information units are assigned by the rendering count. In the example of FIG. 9, a character "A" is rendered over bands 0 and 1 by rendering information units appl 1 and appl 2, and also rendered in band n by appl 5.

Each element contained in the rendering information unit shown in FIG. 10 suffices to have bits at least expressible on a designated sheet at a designated resolution. The link between each rendering information and each rendering object is not limited to an address in the RAM, and may be based on an ID (in this case, the ID is converted into an address via an ID table prepared in advance).

In order to render rendering objects in respective bands and generate a band image by the above arrangement, linked rendering information units are sequentially read out from the band table, and rendering objects are rendered in accordance with pieces of print position information stored in the rendering information units. This process is repeated until the next rendering information address becomes NULL, ending the rendering process of one band.

By the above procedures, the printing system according to the first embodiment can prevent the down time caused by the stop and restart of the printer engine during image formation at a designated page count (n+1). The printing system can prevent a delay of the process time caused by the down time, and can shorten the output time.

First Modification to First Embodiment

In the process of FIG. 11, the total predicted processing time STp(p,n) taken to PDL-analyze n pages subsequent to the page p of interest, the time, and the time (throughput maintenance interval) STe(n) taken to form the image of each page are calculated. The difference STp(p,n)−STe(n) is defined as the output delay time of the page of interest.

According to this method, however, if pages longer in predicted processing time than the throughput maintenance interval Te of one page and pages shorter in predicted processing time coexist, the printing processing is interrupted while outputting n+1 pages. To prevent the down time, letting p be the page of interest, the predicted processing time is calculated for each of n subsequent pages (p+1, p+2, . . . , p+n). First, the predicted processing time Tp(i) of each page (page i) is calculated on the basis of analysis time information. Then, the prediction value STp(p,i) of the analysis completion time of each page is calculated. The prediction value STp(p,i) is calculated by accumulating the predicted processing times Tp(i) of respective pages.

The time STe(i) represents the best shipping start timing of the page p+i by using the shipping start timing of the page p as a reference (i.e., 0). In order to prevent the engine from stopping while outputting the pth to (p+1)th pages, the shipping timing must be delayed as follows. More specifically, the shipping timing must be delayed in accordance with a page having the largest time lag between the best shipping timing STe(i) calculated on the basis of the throughput maintenance interval and the analysis completion time STp(p,i).

For this purpose, STp(p,i)−STe(i) is calculated for each page p+i from the page p+1 immediately after the page p of interest to the page p+n. The calculated value is the delay time of the page p+i. The calculated value STp(p,i)−STe(i) is saved in the RAM or the like, and the maximum value (MAX(STp(p,i)−STe(i)), i=1, . . . , n) is determined among saved values. The maximum value is used as the delay time in the first modification. That is, according to the first modification, the process to calculate STp(p,i)−STe(i) for each i and determine the maximum value is executed in step S1104 of FIG. 11. In step S1106, the maximum delay value is compared with 0. In step S1107, the /PRNT signal of the page of interest is delayed by the maximum delay time.

For example, the throughput maintenance interval of one page=2, and the designated n=3. The predicted processing times of three pages starting from a page next to the page of interest are 2, 3, and 1, respectively. In this case, as for a page next to the page of interest, the predicted processing time is 2, the throughput maintenance interval is 2×1=2, and thus the delay time T1=2−2=0. As for a page second next to the page of interest, i.e., a page ahead by two pages, the predicted processing time is 2+3=5, the throughput maintenance interval is 2×2=4, and thus the delay time T2=5−4=1. As for a page third next to the page of interest, i.e., a page ahead by three pages, the predicted processing time is 2+3+1=6, the throughput maintenance interval is 3×2=6, and thus the delay time T3=6−6=0.

The maximum value T2=1 is selected as the delay time from T1, T2, and T3. Output of the /PRNT signal of the page of interest starts after a delay of one timing upon completion of image formation. The shipping timing of the page of interest and n subsequent pages coincides with the predicted analysis completion time or becomes later. As a result, the down time of the printer engine can be prevented while outputting the page of interest and n subsequent pages, i.e., the total of n+1 (4 in this example) pages.

In the first embodiment, the designated value n is used to continuously output a document to be printed every (n+1) pages from the start. When the user is prompted to designate the value n, he is prompted to designate the number of pages including the start page, further improving operability.

Note that the first modification is based on the first embodiment, and part of the first modification that is not particularly described is common to the first embodiment.

The first embodiment is summarized as follows. The prediction time taken to analyze n pages is calculated by referring to pieces of analysis time information of n pages subsequent to the page of interest. For each page, the analysis completion timing of the page and the output timing of the page image of the page to the printer engine are made to match each other, or the output timing is set later. For this purpose, the output timing of the page image of the page of interest (i.e., start page) is delayed in accordance with a page having the maximum time lag between the shipping timing and the analysis completion timing. Even if the engine is driven at the throughput maintenance interval, shipping starts immediately after the completion of analysis at the earliest for each of the page of interest and n subsequent pages. Thus, the engine throughput does not decrease.

Second Modification to First Embodiment

The printer engine performs a pre-rotation process at the start, as described above. This process requires a predetermined time. If the engine stops, it is activated early by the time (also called the ready time Tw) necessary for the pre-rotation process. After the engine reaches the steady driving state, it ships a page image, hastening the print completion time by the ready time. For this purpose, according to the second modification, driving of the engine starts at the timing MAX (STp(p,i)−STe(i))−Tw obtained by subtracting the ready time Tw from the delay time (MAX(STp(p,i)−STe(i))) in the first modification. The base point of this timing is the time when analysis of the page p is complete. This setting makes it possible to further hasten the activation time of the engine. Shipping of the page p starts Tw after engine activation. This process is executed in step S1108 of FIG. 11. Accordingly, n+1 pages from the page p to the page p+n can be continuously printed without any down time. The analysis process proceeds parallel to the engine activation process, further shortening the print time.

Note that the second modification is based on the first modification to the first embodiment, and part of the second modification that is not particularly described is common to the first modification to the first embodiment.

Second Embodiment

<Example of Print Job Process in Image Output System According to Second Embodiment>

In the first embodiment, the timing when an output instruction to the printer engine starts is calculated from the analysis time Tp and throughput maintenance interval Te. In the second embodiment, the timing when an output instruction starts can be calculated in consideration of even the time until the printer engine can output a page image after receiving the output instruction. The time until the printer engine can output a page image after receiving the output instruction is the time required for a pre-rotation process in the first embodiment, and will be called a ready time Tw. When Tp−Te>0 and it is determined that the down time arises, the engine starts at the timing earlier by Tw than the timing Tp−Te, i.e., the timing delayed by Tp−Te−Tw, instead of delaying the start of output by only Tp−Te. With this setting, the printer engine can start outputting a page image with the minimum standby time, more efficiently controlling the engine.

The ready time is the time until the printer engine reaches the ready state after outputting the /PRNT signal to the printer engine. The ready time is determined in advance from the time taken to activate the scanner motor, the time taken to raise the temperature of the fixing unit, and the like. In the second embodiment, the ready time is 3 sec.

In the second embodiment, the output timing is calculated by comparing Tp and Te of each reference page with those of a subsequent page, and only when the difference is positive, setting the output timing earlier by only Te. Let Tp(i) be the analysis completion time of pages up to a page i, and Te be the throughput maintenance time of one page.

In the first embodiment, n+1 pages are continuously output for n designated pages. The PDL analysis completion time of the start page of the n+1 pages is defined as the base of the shipping delay. In contrast, in the second embodiment, n pages are continuously output for n designated pages. The PDL analysis completion time of the start page of the n pages is defined as the base of the shipping delay. However, these differences between the first and second embodiments are merely differences in rule, and can be easily changed.

In the second embodiment, the following operation is performed when the page p of interest satisfies (p mod n=0). If the value Tp(p+n)−Te=Ts(p+n) is positive, the printer engine starts outputting the (p+n−1)th page at the timing earlier by Te than the timing when PDL analysis of the (p+n)th page ends. That is, Ts(p+n) is the output start timing of the (p+n−1)th page based on the PDL analysis start time of the (p+n)th page. This is because it is most efficient in this case to output the final page immediately after the completion of analyzing the final page. If Ts(p+n) is 0 or negative, Ts(p+n) is set to 0. If the value calculated by subtracting Te from the sum of Tp(p+n−1) of the (p+n−1)th page and Ts(p+n) is positive, the output timing of the (n−1)th page is set to the timing Ts(p+n−1)=Ts(p+n)+Tp(p+n−1)−Te earlier by Te. The timing Ts(p+n−1) is the output start timing of the (p+n−2)th page based on the PDL analysis start time of the (p+n−1)th page. If Ts(p+n−1) is negative, output of the (p+n−2)th page cannot start early, and Ts(p+n−1) is set to 0.

The above procedures are repeated sequentially by n pages from the last page (page p+n) to the start page (page p+1), and the timing earlier by the ready time Tw is finally defined as the printer engine activation timing. These procedures are executed in steps S1104 to S1108 of FIG. 11.

Figure 13:
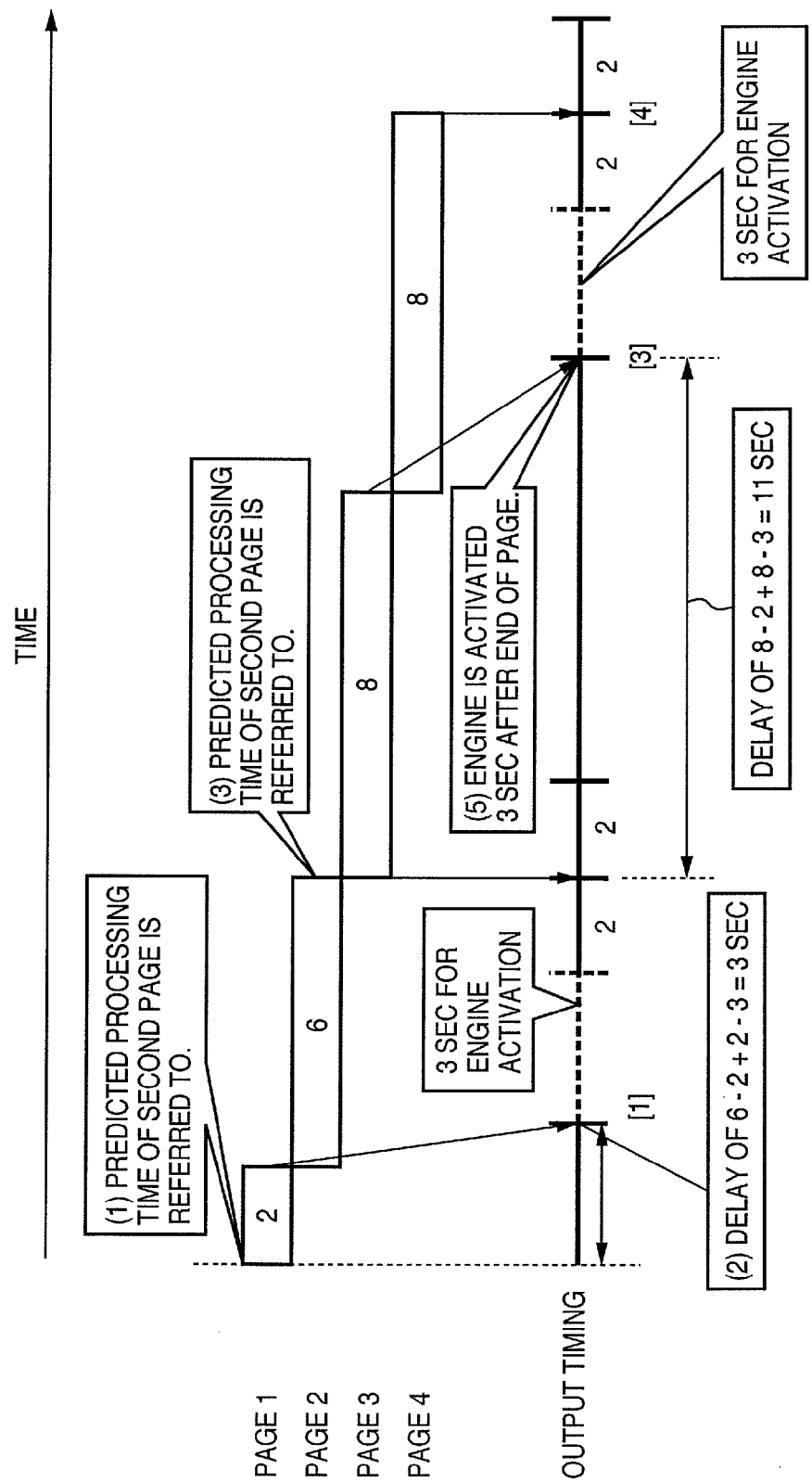
FIG. 13 is a timing chart showing a control example of engine activation and the output start timing of each page in the second embodiment.

FIG. 13 shows a control example of the output timing in the second embodiment. In FIG. 13, n =1, but a larger number n is desirable. In practice, the number of pages readable from print data input to the reception buffer is referred to. The meaning of "n" in the second embodiment is the same as that in the first embodiment.

FIG. 13 shows an example for n=1, i.e., an example of continuously outputting pages every two pages from the start of a document. FIG. 13 shows a state of processing a 4-page print job. The analysis times Tp of respective pages are calculated into 2, 6, 8, and 8 sec.

Before PDL analysis of the first page, an analysis time information analyzing unit $303c$ calculates the analysis times Tp of the first and second pages by referring to their analysis time information. If the analysis time information analyzing unit $303c$ determines that the analysis times Tp of the first and second pages are 2 sec and 6 sec, respectively, it subtracts Te from Tp of the second page: 6−2=4 sec>0. Thus, the analysis time information analyzing unit $303c$ sets the output start timing of the first page to a timing earlier by Te (2 sec) than the timing when PDL analysis of the second page ends. That is, the start of outputting the first page is delayed by 4 sec from the start of PDL-analyzing the second page.

Subsequently, the analysis time information analyzing unit $303c$ adds Tp(1)=2 to the difference "4 sec" (=Ts(2)), and subtracts Tw=3 from the sum, i.e., calculates 4+2−3=3 sec, which is the shipping delay time of the first page. When the printer engine is activated 3 sec after the start of PDL-analyzing the first page, it can output the first and second pages while maintaining the highest throughput. If the delay time becomes shorter than Tp of the first page, the printer engine may be activated during analysis of the first page before the end of PDL-analyzing the first page. If the result of subtracting Tw becomes negative, the printer engine can start immediately after calculating the next Tp. By controlling the printer engine in this way, it can start outputting the second page immediately after the end of PDL-analyzing the second page.

Similarly, before PDL analysis of the third page, the analysis time information analyzing unit $303c$ calculates the analysis times Tp of two, third and fourth pages. If the analysis times Tp of the third and fourth pages are 8 sec and 8 sec, respectively, Ts(4)=8−2=6 sec, i.e., the printer engine outputs the third page 2 sec before the end of PDL-analyzing the fourth page. In other word, the printer engine starts outputting the third page 6 sec after the completion of analyzing the third page. The analysis time information analyzing unit $303c$ similarly calculates Ts(3), i.e., Ts(3)=Ts(4)+Tp(3)−Tw=6+8−3=11 sec. The engine is activated with a delay of 11 sec after the start of PDL-analyzing the third page, and starts shipping the third page after Tw. The engine can also output the third and fourth pages while maintaining the throughput.

Figure 14:
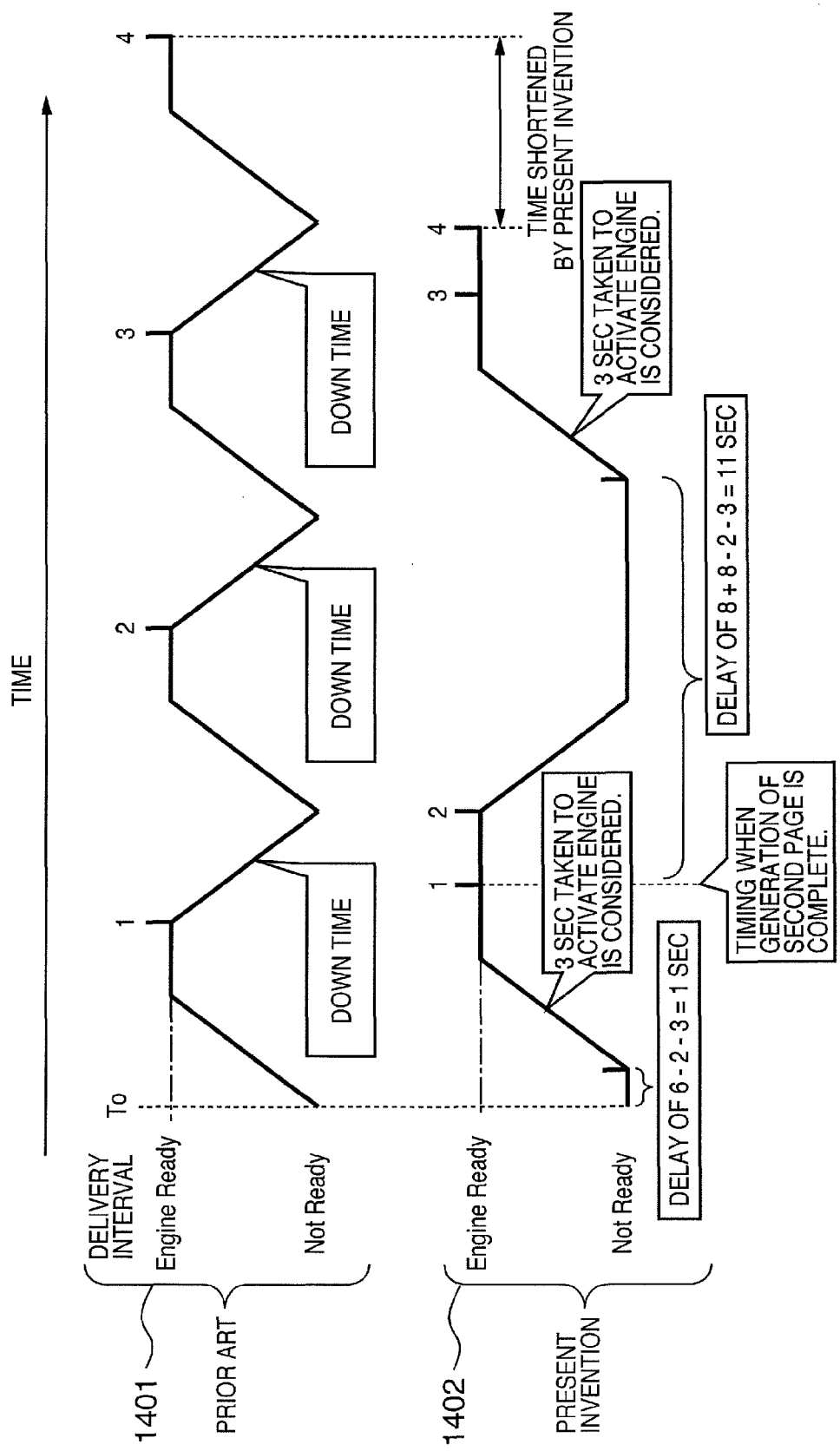
FIG. 14 is a timing chart showing an example of the engine state and the delivery interval by a conventional control method and an example of the engine state and the delivery interval by an engine control method according to the second embodiment.

As described above, the timing when the printer engine is activated is controlled in consideration of the throughput maintenance interval Te and ready time Tw. The number of occurrence of the down time can be decreased from that in the prior art, as shown in FIG. 14, and the time until output of the final page is complete can be shortened.

First Modification to Second Embodiment

Figure 16:
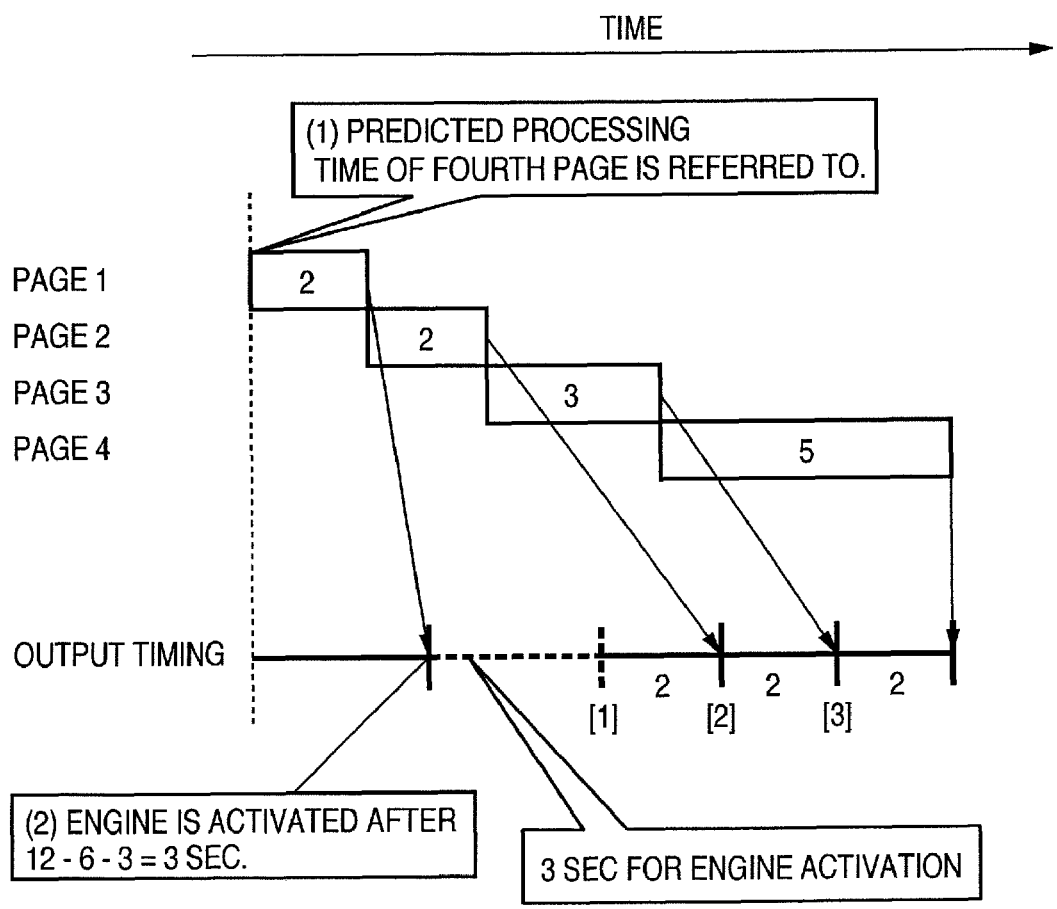
FIG. 16 is a timing chart showing a control example of engine activation and the output start timing of each page in a modification to the second embodiment.

FIG. 16 shows the first modification to the second embodiment when n=4, Tw=3 sec, Te=2 sec, the analysis times Tp of respective pages are 2, 3, 3, and 5 sec in the second embodiment. The following calculation starts sequentially from the fourth page:

$$Tp(4)-Te=5-2=3:Ts(4)$$

Since Ts(4) is positive, it is determined that output of the third page must be delayed from the PDL analysis end timing. After that, the output timing Ts(3) of the second page is also calculated:

$$Ts(4)+Tp(3)-Te=3+3-2=4:Ts(3)$$

Since Ts(3) is positive, it is determined that output of the second page must also be delayed from the PDL analysis end timing. Further, the output timing Ts(2) of the first page is similarly calculated:

$$Ts(3)+Tp(2)-Te=4+2-2=4:Ts(2)$$

Since Ts(2) is positive, it is determined that output of the first page must also be delayed from the PDL analysis end timing. Finally, the engine activation timing is calculated:

$$Ts(2)+Tp(1)-Tw=4+2-3=3:Ts(1)$$

By activating the printer engine 3 sec after the start of PDL-analyzing the first page, the printer engine can output the first to fourth pages while maintaining the engine throughput.

Second modification to Second Embodiment

Figure 17:
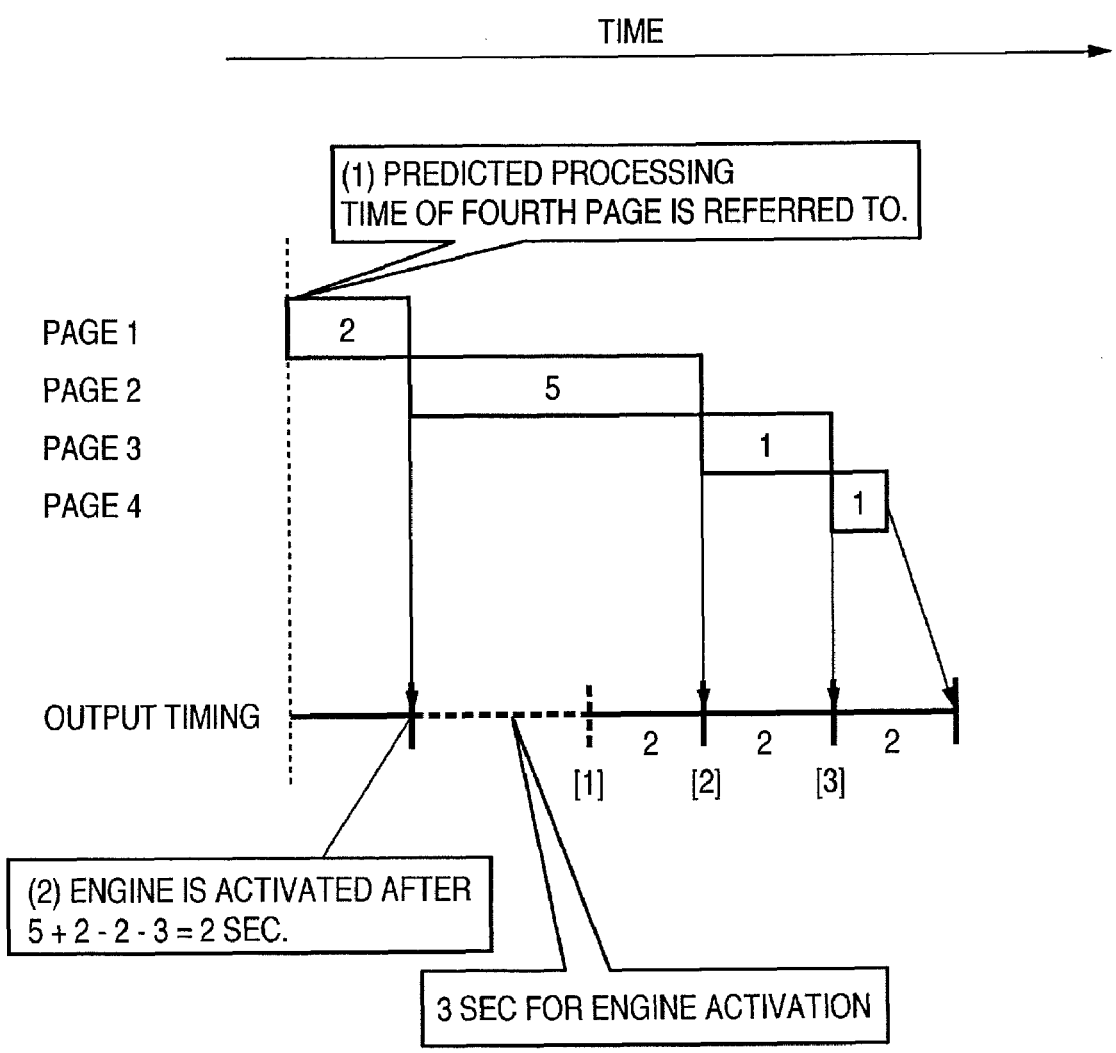
FIG. 17 is a timing chart showing a control example of engine activation and the output start timing of each page in the second modification to the second embodiment.

FIG. 17 shows a case where n=4, Tw=3 sec, Te=2 sec, the analysis times Tp of respective pages are 2, 5, 2, and 1 sec. The following calculation starts sequentially from the fourth page:

$$Tp(4)-Te=1-2=-1:Ts(4)$$

Since Ts(4) is negative, it is determined that output of the third page cannot be delayed from the PDL analysis end timing. That is, Ts(4)=0. The output timing Ts(3) of the third page is calculated:

$$Ts(4)+Tp(3)-Te=0+2-2=0:Ts(3)$$

Since Ts(3) is 0, it is determined that the second page is output at the same time as the end of PDL analysis. Subsequently, the output timing of the first page is calculated:

$$Ts(3)+Tp(2)-Te=0+5-2=3:Ts(2)$$

Since Ts(2) is positive, the engine activation timing is calculated:

$$Ts(2)+Tp(1)-Tw=3+2-3=2$$

By activating the printer engine 2 sea after the start of PDL-analyzing the first page, the printer engine can output the first to fourth pages while maintaining the engine throughput.

First Modification to First and Second Embodiments

In the first and second embodiments, the time Tp taken to PDL-analyze each page is predicted from the number of rendering instructions obtained by the printer driver and the throughput of the printer controller per unit time. To the contrary, recalculation can be omitted in reprinting of spooling print data in the HDD or the like, and designating the print data from the panel or the like to output the print data a plurality of number of times. That is, it is also possible to store the PDL process time Tp of each page in the first printing and use it for printer engine control in the second and subsequent printing processes. In this modification, the accurate times Tp of all pages contained in a print job are obtained in advance, so the printer engine can be controlled most efficiently.

Second Modification to First and Second Embodiments

In the first and second embodiments, the time Tp taken to PDL-analyze each page is calculated from the number of rendering instructions obtained by the printer driver and the throughput of the printer controller per unit time. Instead of sending analysis time information from the printer driver, the printer driver may calculate the time Tp taken to PDL-analyze each page. However, this modification requires a printer driver corresponding to each printer.

Third Modification to First and Second Embodiments

The present invention can also be applied in consideration of a down time factor other than the ready time taken to activate the printer engine. For example, the present invention may consider the time taken to switch the sheet size (feed stage), or the delay time generated upon switching the color engine between monochrome printing and color printing. In this modification, when a page satisfying the above condition exists in calculating the output timing, it is calculated whether the page can be output earlier by the sum of the throughput maintenance interval Te and a down time-dependent delay.

In the first and second embodiments, analysis time information contains the prediction times of respective rendering commands for each page. However, the host computer can calculate the prediction time of each command when acquiring in advance throughput information of a destination printer which issues a job. Thus, the host computer can also calculate the predicted processing time of a page by accumulating type-dependent prediction times every time a command appears. In this case, analysis time information can contain the predicted processing time. This can reduce the process burden to calculate the predicted processing time of the image forming apparatus.

Example of Software Arrangement

Other Embodiments

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code itself installed in the computer also implements the present invention. In other words, the claims of the present invention also cover a computer program for the purpose of implementing the functions of the present invention.

In this case, so long as the system or apparatus has the functions of the program, the program may be executed in any form, e.g., as object code, a program executed by an interpreter, or scrip data supplied to an operating system.

Examples of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

Further, it is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Furthermore, besides the case where the aforesaid functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

When the present invention is applied to the storage medium, the storage medium stores program codes corresponding to the above-described flowcharts (shown in FIGS. 5, 12, and 13).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2005-255617 filed on Sep. 2, 2005, which is hereby incorporated by reference herein in its entirety.

What is claimed is:

1. An image forming system having an image forming apparatus and a print data generation apparatus which generates print data of a format interpretable by the image forming apparatus and outputs the print data to the image forming apparatus, the print data generation apparatus comprising:
a print data generation unit which generates the print data; and
a transmitting unit which transmits the print data to said image forming apparatus;

the image forming apparatus comprising:
a reception unit which receives print data transmitted from said print data generation apparatus;
an image data generation unit which generates a plurality of pages of image data on the basis of the print data received by said reception unit;
an image forming unit which forms the plurality of pages of image data generated by said image data generation unit on print media at a specified time interval;
a calculation unit which calculates a generation time taken to generate image data of each page of the plurality of pages of image data by said image data generation unit from the print data received by said reception unit; and a control unit which controls a timing for transferring each page of the plurality of pages of image data generated by said image data generation unit to said image forming unit when the plurality of pages of image data generated by said image data generation unit is output to said image forming unit, wherein said control unit a) controls the timing for transferring image data of a page of interest so that, in a case where a generation time taken to generate image data of a predetermined number of pages following the page of interest is shorter than an image forming time to be taken to form sequentially the predetermined number of pages of the image data with the specific time interval between pages, image data of the page of interest is transferred to said image forming unit in response to generation of the image data of the page of interest by said image data generation unit, and b) controls the timing for transferring image data of the page of interest so that, in a case where the generation time taken to generate image data of the predetermined number of pages following the page of interest is longer than the image forming time, the image data of the page of interest is transferred to said image forming unit with a delay equivalent to difference time between the generation time and the image forming time.

2. The system according to claim 1, wherein said image data generation unit adds time information taken to generate image data from the print data to the print data, and said calculation unit calculates the generation time on the basis of the time information added to the print data.

3. The system according to claim 1, wherein said control unit controls a medium feed timing by said image forming unit in accordance with the timing when said image data generation unit outputs image data to said image forming unit.

4. The system according to claim 2, wherein said print data generation unit generates the time information for each page, and adds the time information to each data which forms each page of the print data.

5. An image forming apparatus comprising:
a reception unit which receives print data transmitted from a print data generation apparatus;
a generation unit which generates a plurality of pages of image data on the basis of the print data received by said reception unit;
a calculation unit which calculates a generation time taken to generate image data of each page of the plurality of image data by said generation unit from the print data received by said reception unit;
an image forming unit which forms the plurality of pages of image data generated by said generation unit on print media at a specific time interval; and
a control unit which controls a timing for transferring each page of the plurality of pages of image data generated by said image data generation unit to said image forming unit when the plurality of pages of image data generated by said generation unit is output to said image forming unit, wherein said control unit a) controls the timing for transferring image data of a page of interest so that, in a case where a generation time taken to generate image data of a predetermined number of pages following the page of interest is shorter than an image forming time to be taken to form sequentially the predetermined number of pages of the image data with the specific time interval between pages, image data of the page of interest is transferred to said image forming unit in response to generation of the image data of the page of interest by said image data generation unit, and b) controls the timing for transferring image data of the page of interest so that, in a case where the generation time taken to generate image data of the predetermined number of pages following the page of interest is longer than the image forming time, the image data of the page of interest is transferred to said image forming unit with a delay equivalent to difference time between the generation time and the image forming time.

6. The apparatus according to claim 5, wherein said generation unit adds time information taken to generate image data from the print data to said print data, and said calculation unit calculates the generation time on the basis of the time information added to the print data.

7. The apparatus according to claim 5, wherein said control unit controls a medium feed timing by said image forming unit in accordance with the timing when said generation unit outputs image data to said image forming unit.

8. An image forming method comprising the steps of:
receiving print data transmitted from a print data generation apparatus;
generating a plurality of pages of image data on the basis of the print data received in the step of receiving print data;
forming the plurality of pages of generated image data on print media at a specific time interval by using an image forming unit;
calculating a generation time taken to generate image data of each page of the plurality of pages of image data from the print data in the step of generating image data; and
controlling a timing for transferring each page of the plurality of pages of image data generated in the step of generating image data to the image forming unit when the plurality of pages of image formation based on the image data generated in the step of generating image data starts in the step of forming an image, wherein in the step of controlling the timing, the timing is a) controlled for transferring image data of a page of interest so that, in a case where a generation time taken to generate image data of a predetermined number of pages following the page of interest is shorter than an image forming time to be taken to form sequentially the predetermined number of pages of the image data with the specific time interval between pages, image data of a page of interest is input to the step of forming an image in response to generation of the image data of the page of interest in the step of generating image data, and b) controlled for transferring image data of the page of interest so that, in a case where the generation time taken to generate image data of the predetermined number of pages following the page of interest is longer than the image forming time, the image data of the page of interest is input to the step of forming an image with a delay equivalent to difference time between the generation time and the image forming time.

9. The method according to claim 8, further comprising the step of adding a time information taken to generate image data from the print data, and in the step of calculating a generation time, the generation time is calculated on the basis of the time information.

10. The method according to claim 9, wherein in the step of generating print data, the time information is generated for each page and added to each data which forms each page of the print data.

* * * * *